(12) United States Patent
Suto et al.

(10) Patent No.: US 10,127,931 B2
(45) Date of Patent: Nov. 13, 2018

(54) PERPENDICULAR MAGNETIC RECORDING AND REPRODUCING DEVICE

(71) Applicant: KABUSHIKI KAISHA TOSHIBA, Tokyo (JP)

(72) Inventors: Hirofumi Suto, Kanagawa (JP); Kiwamu Kudo, Kanagawa (JP); Tazumi Nagasawa, Kanagawa (JP); Taro Kanao, Kanagawa (JP); Rie Sato, Kanagawa (JP); Koichi Mizushima, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 244 days.

(21) Appl. No.: 15/266,161

(22) Filed: Sep. 15, 2016

(65) Prior Publication Data

US 2017/0256273 A1    Sep. 7, 2017

(30) Foreign Application Priority Data

Mar. 4, 2016   (JP) .................... 2016-042397

(51) Int. Cl.
*G11B 5/09* (2006.01)
*G11B 5/012* (2006.01)
(Continued)

(52) U.S. Cl.
CPC .............. *G11B 5/09* (2013.01); *G11B 5/012* (2013.01); *G11B 5/313* (2013.01); *G11B 2005/0021* (2013.01); *G11B 2005/0024* (2013.01)

(58) Field of Classification Search
None
See application file for complete search history.

(56) References Cited

U.S. PATENT DOCUMENTS 8,023,218 B2 * 9/2011 Zhou ............... G11B 5/1278
   360/59
8,233,230 B2   7/2012 Yano et al.
(Continued)

FOREIGN PATENT DOCUMENTS

JP   2004-355739   12/2004
JP   2005-285242   10/2005
(Continued)

OTHER PUBLICATIONS

Jian-Gang Zhu, et al., "Microwave Assisted Magnetic Recording", IEEE Transactions on Magnetics, vol. 44 No. 1, (2008).

*Primary Examiner* — Tan X Dinh
(74) *Attorney, Agent, or Firm* — Finnegan, Henderson, Farabow, Garrett & Dunner, L.L.P.

(57) ABSTRACT

According to one embodiment, a magnetic recording and reproducing device includes a magnetic recording medium, a magnetic head, and a controller. The controller implements a first operation and a second operation. The first operation is implemented in a first information recording interval including a first recording interval and a first non-recording interval. The second operation is implemented in a second information recording interval including a second recording interval and a second non-recording interval. The first operation includes in the first recording interval, generating a first signal magnetic field from the magnetic head, and in the first non-recording interval, generating a first non-signal magnetic field from the magnetic head. The second operation includes in the second recording interval, generating a second signal magnetic field from the magnetic head, and in the second non-recording interval, generating a second non-signal magnetic field from the magnetic head.

20 Claims, 13 Drawing Sheets

(51) Int. Cl.
  *G11B 5/31* (2006.01)
  *G11B 5/00* (2006.01)

(56) References Cited

U.S. PATENT DOCUMENTS

| | | | |
|---|---|---|---|
| 8,953,273 | B1 | 2/2015 | Funayama |
| 9,019,660 | B2 | 4/2015 | Funayama |
| 2003/0227701 | A1* | 12/2003 | Clinton ............ G11B 5/00 360/46 |
| 2005/0047283 | A1* | 3/2005 | Ruigrok ............ B82Y 10/00 369/13.14 |
| 2005/0219771 | A1 | 10/2005 | Sato et al. |
| 2006/0114590 | A1* | 6/2006 | Hamaguchi ......... G11B 5/1278 360/59 |
| 2007/0253106 | A1 | 11/2007 | Sato et al. |
| 2009/0310244 | A1 | 12/2009 | Shimazawa et al. |
| 2010/0110576 | A1* | 5/2010 | Akagi ............ B82Y 10/00 360/59 |
| 2010/0134922 | A1* | 6/2010 | Yamada ............ G11B 5/1278 360/123.01 |
| 2012/0224283 | A1 | 9/2012 | Sato et al. |
| 2014/0247520 | A1 | 9/2014 | Yang et al. |
| 2017/0061999 | A1 | 3/2017 | Suto et al. |
| 2017/0186450 | A1* | 6/2017 | Yamada ............ G11B 5/1278 |

FOREIGN PATENT DOCUMENTS

| | | |
|---|---|---|
| JP | 2007-299460 | 11/2007 |
| JP | 2009-301695 | 12/2009 |
| JP | 2010-218598 | 9/2010 |
| JP | 5509208 | 3/2014 |
| JP | 2014-86122 | 5/2014 |
| JP | 2014-170604 | 9/2014 |
| JP | 2016-12384 | 1/2016 |
| JP | 6072172 | 1/2017 |

* cited by examiner

PERPENDICULAR MAGNETIC RECORDING AND REPRODUCING DEVICE

CROSS-REFERENCE TO RELATED APPLICATIONS

This application is based upon and claims the benefit of priority from Japanese Patent Application No. 2016-042397, filed on Mar. 4, 2016; the entire contents of which are incorporated herein by reference.

FIELD

Embodiments described herein relate generally to a magnetic recording and reproducing device.

BACKGROUND

In a magnetic recording and reproducing device, information is recorded in a magnetic recording medium such as a HDD (Hard Disk Drive), etc., using a magnetic head. For example, perpendicular magnetic recording is advantageous for high density recording. It is desirable to increase the recording density of the magnetic recording and reproducing device.

DETAILED DESCRIPTION

Figure 1A:
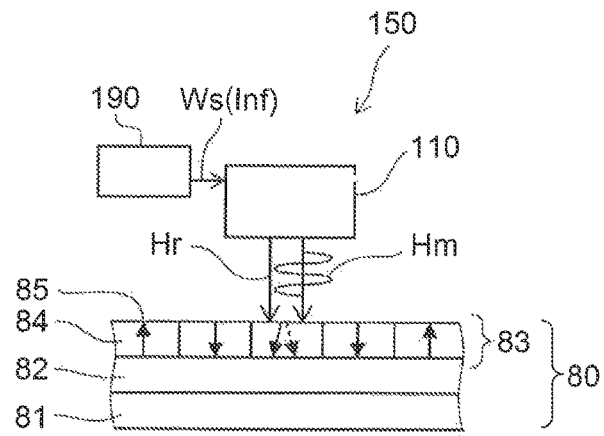
FIG. 1A and FIG. 1B are schematic views illustrating a magnetic recording and reproducing device according to a first embodiment.

According to one embodiment, a magnetic recording and reproducing device includes a magnetic recording medium, a magnetic head, and a controller. The controller implements a first operation and a second operation. The first operation is implemented in a first information recording interval. The first information recording interval includes a first recording interval and a first non-recording interval. The second operation is implemented in a second information recording interval. The second information recording interval includes a second recording interval and a second non-recording interval and is continuous with the first information recording interval. The first operation includes, in the first recording interval, generating a first signal magnetic field while generating a first recording magnetic field from the magnetic head, the first signal magnetic field being of a first intensity and a high frequency, the first recording magnetic field corresponding to the first information, and, in the first non-recording interval, generating a first non-signal magnetic field from the magnetic head, the first non-signal magnetic field being of an intensity lower than the first intensity. The second operation includes, in the second recording interval, generating a second signal magnetic field while generating a second recording magnetic field from the magnetic head, the second signal magnetic field being of a second intensity and a high frequency, the second recording magnetic field corresponding to the first information, and, in the second non-recording interval, generating a second non-signal magnetic field from the magnetic head, the second non-signal magnetic field being of an intensity lower than the second intensity.

Various embodiments will be described hereinafter with reference to the accompanying drawings.

The drawings are schematic and conceptual; and the relationships between the thickness and width of portions, the proportions of sizes among portions, etc., are not necessarily the same as the actual values thereof. Further, the dimensions and proportions may be illustrated differently among drawings, even for identical portions.

In the specification and drawings, components similar to those described or illustrated in a drawing thereinabove are marked with like reference numerals, and a detailed description is omitted as appropriate.

First Embodiment

Figure 1B:
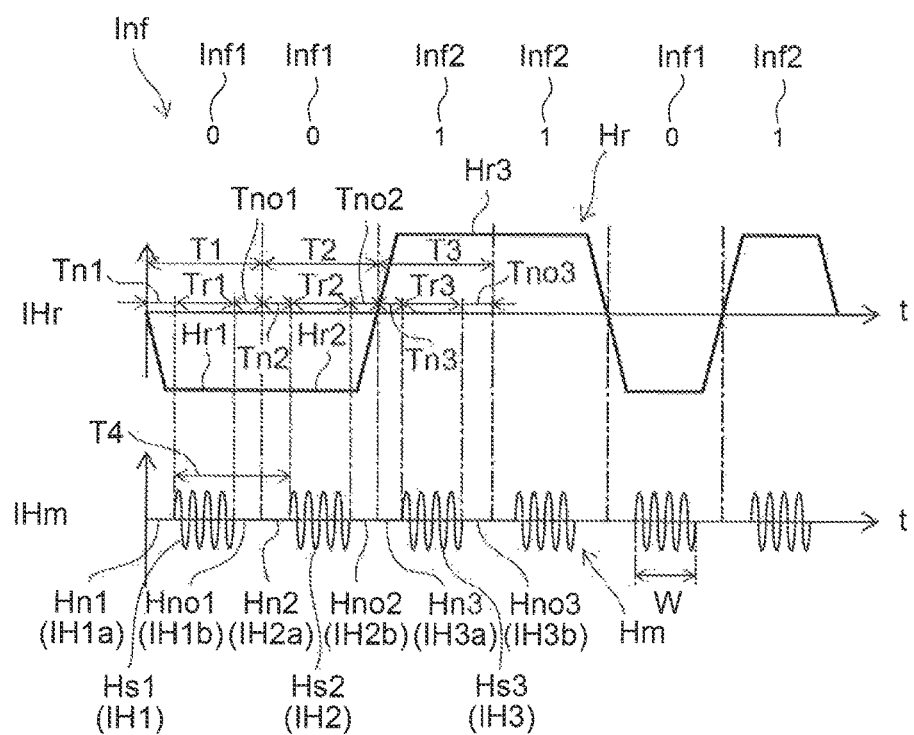

FIG. 1A and FIG. 1B are schematic views illustrating a magnetic recording and reproducing device according to a first embodiment.

FIG. 1A illustrates the magnetic recording and reproducing device. FIG. 1B illustrates an operation of the magnetic recording and reproducing device.

As shown in FIG. 1A, the magnetic recording and reproducing device 150 according to the embodiment includes a magnetic head 110, a controller 190, and a magnetic recording medium 80. In the magnetic recording and reproducing device 150, information Inf is recorded in the magnetic recording medium 80. The controller 190 supplies, to the magnetic head 110, a signal Ws corresponding to the information Inf. The magnetic head 110 generates a recording magnetic field Hr and a high frequency magnetic field Hm according to the signal Ws.

FIG. 1B is a timing chart illustrating the recording magnetic field Hr and the high frequency magnetic field Hm.

In FIG. 1B, the horizontal axis shows time t. The vertical axis shows an intensity IHr of the recording magnetic field Hr or an intensity IHm of the high frequency magnetic field Hm. The information Inf includes, for example, first information Inf12 and second information Inf2. The first information Inf1 is, for example, one of "1" or "0." The second information Inf2 is the other of "1" or "0." In the example of FIG. 1B, the first information Inf1 is "0;" and the second information Inf2 is "1." In the embodiment, the relationship of the first information Inf1 and the second information Inf2 may be reversed.

In the example of FIG. 1B, the first information Inf1 ("0") is continuous. Thus, in the recording of the continuous information Inf, a first operation and a second operation such as those recited below are performed. The first operation corresponds to the recording of the previous first information Inf1. The second operation corresponds to the subsequent first information Inf1. In FIG. 1B as described below, the second information Inf2 ("1") may be recorded after the first information Inf1. At this time, a third operation that is described below is performed according to the recording of the second information Inf2. For example, these operations are performed by the controller 190. The first operation and the second operation will now be described.

The first operation is implemented in a first information recording interval T1. The first information recording interval T1 corresponds to the interval of the recording of the previous first information Inf1 ("0"). The second operation is implemented in a second information recording interval T2. The second information recording interval T2 corresponds to the interval of the recording of the subsequent first information Inf1 ("0"). The second information recording interval T2 is continuous with the first information recording interval T1.

The first information recording interval T1 includes a first recording interval Tr1 and a first non-recording interval Tn1. The first recording interval Tr1 is after the first non-recording interval Tn1 in the first information recording interval T1. In the example, a first other non-recording interval Tno1 is further provided in the first information recording interval T1. The first other non-recording interval Tno1 is after the first recording interval Tr1.

The second information recording interval T2 includes a second recording interval Tr2 and a second non-recording interval Tn2. The second recording interval Tr2 is after the second non-recording interval Tn2 in the second information recording interval T2. In the example, a second other non-recording interval Tno2 is further provided in the second information recording interval T2. The second other non-recording interval Tno2 is after the second recording interval Tr2. The first other non-recording interval Tno1 and the second other non-recording interval Tno2 are described below.

The operations of the first non-recording interval Tn1, the first recording interval Tr1, the second non-recording interval Tn2, and the second recording interval Tr2 will now be described.

In the first operation (the first information recording interval T1) as shown in FIG. 1B, the controller 190 in the first recording interval Tr1 generates a first signal magnetic field Hs1 of a high frequency while generating a first recording magnetic field Hr1 from the magnetic head 110. The first recording magnetic field Hr1 is a magnetic field corresponding to the first information Inf1. The first signal magnetic field Hs1 has a first intensity IH1.

Further, in the first operation, the controller 190 in the first non-recording interval Tn1 generates a first non-signal magnetic field Hn1 from the magnetic head 110. The first non-signal magnetic field Hn1 has an intensity IH1a. The intensity IH1a is lower than the first intensity IH1. In the first operation, the controller 190 in the first non-recording interval Tn1 further generates the first recording magnetic field Hr1 from the magnetic head 110.

In the second operation (the second information recording interval T2), the controller 190 in the second recording interval Tr2 generates a second signal magnetic field Hs2 of a high frequency while generating a second recording magnetic field Hr2 from the magnetic head 110. The second recording magnetic field Hr2 is a magnetic field corresponding to the first information Inf1. The second signal magnetic field Hs2 has a second intensity IH2.

Further, in the second operation, the controller 190 in the second non-recording interval Tn2 generates a second non-signal magnetic field Hn2 from the magnetic head 110. The second non-signal magnetic field Hn2 has an intensity IH2a. The intensity IH2a is lower than the second intensity IH2. In the second operation, the controller 190 in the second non-recording interval Tn2 further generates the second recording magnetic field Hr2 from the magnetic head 110. For example, the second recording interval Tr2 is after the second non-recording interval Tn2 in the second information recording interval T2.

In the example of FIG. 1B, the first signal magnetic field Hs1 has the first intensity IH1. A magnetization 85 of the magnetic recording medium 80 is reversible by the first signal magnetic field Hs1. The second signal magnetic field Hs2 has the second intensity IH2. The magnetization 85 of the magnetic recording medium 80 is reversible by the second signal magnetic field Hs2. For example, the first signal magnetic field Hs1 and the second signal magnetic field Hs2 each are pulse-modulated by the same pulse width W. For example, the pulse width W is variable. The pulse width W of the first signal magnetic field Hs1 may be different from the pulse width W of the second signal magnetic field Hs2. An interval T4 between the generation of the first signal magnetic field Hs1 and the generation of the second signal magnetic field Hs2 is, for example, substantially the same as the first information recording interval T1. The first information recording interval T1 corresponds to the write period of the information Inf.

The intensity IH1a of the first non-signal magnetic field Hn1 is, for example, not more than ½ of the first intensity IH1. More desirably, the intensity IH1a is not more than ¼ of the first intensity IH1. The intensity IH1a may be, for example, substantially zero. The intensity IH2a of the second non-signal magnetic field Hn2 is, for example, not more than ½ of the second intensity IH2. More desirably, the intensity IH2a is not more than ¼ of the second intensity IH2. The intensity IH2a may be, for example, substantially zero. In the example, recording intervals (the first recording interval Tr1 and the second recording interval Tr2) are provided in which both the recording magnetic field Hr and the high frequency magnetic field Hm are generated; and non-recording intervals (the first non-recording interval Tn1 and the second non-recording interval Tn2) are provided in which the recording magnetic field Hr is generated but the high frequency magnetic field Hm substantially is not generated.

Figure 2:
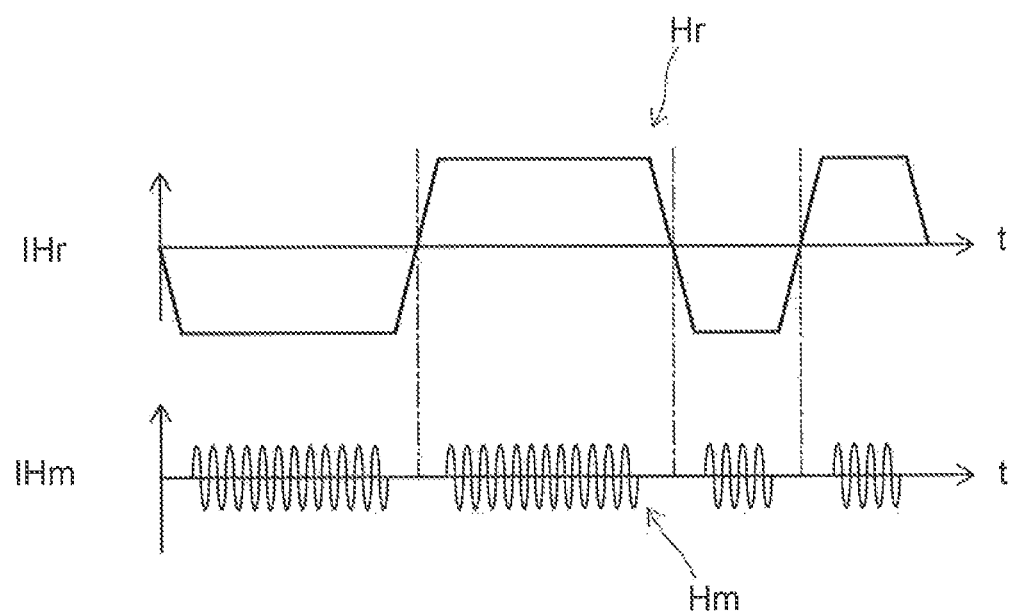
FIG. 2 is a timing chart illustrating an operation of a magnetic recording and reproducing device according to a reference example.

FIG. 2 is a timing chart illustrating an operation of a magnetic recording and reproducing device according to a reference example.

There is a reference example in which the non-recording interval in which the high frequency magnetic field Hm is not generated is provided only when the recording magnetic field Hr reverses from the first information Inf1 ("0") to the second information Inf2 ("1") and from the second information Inf2 ("1") to the first information Inf1 ("0"). In the reference example, the high frequency magnetic field Hm is generated continuously when the recording magnetic field Hr is not reversed from the first information Inf1 ("0") to the first information Inf1 ("0") and from the second information Inf2 ("1") to the second information Inf2 ("1"). Therefore, there are cases where record errors occur.

Characteristics of the magnetic recording and reproducing device according to the embodiment will now be described with the reference example.

Figure 3A:
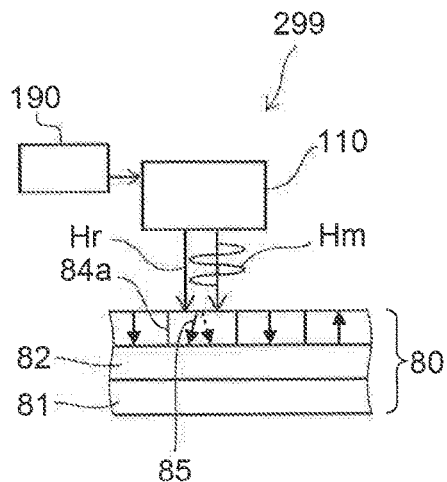
FIG. 3A to FIG. 3C are schematic views illustrating operations of the magnetic recording and reproducing device according to the reference example.
Figure 3B:
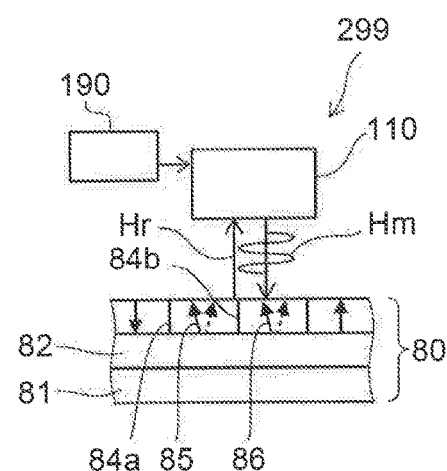
Figure 3C:
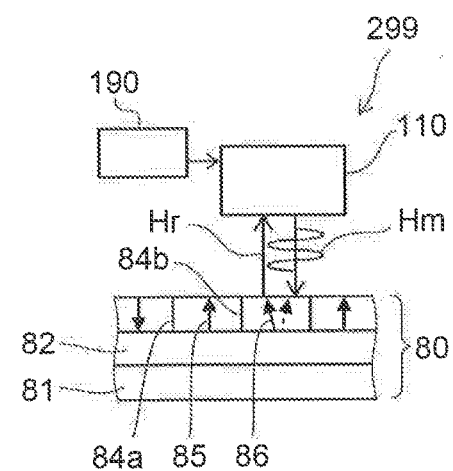

FIG. 3A to FIG. 3C are schematic views illustrating operations of the magnetic recording and reproducing device according to the reference example.

In the magnetic recording and reproducing device 299 according to the reference example, the continuous high frequency magnetic field Hm is applied to the magnetic recording medium 80. For example, the first non-recording interval Tn1 and the second non-recording interval Tn2 are not provided in the reference example.

As shown in FIG. 3A, the continuous high frequency magnetic field Hm and recording magnetic field Hr are applied from the magnetic head 110 to the magnetic recording medium 80. In such a case, the magnetization 85 is switched downward while causing assisted magnetization reversal of a recorded bit 84a directly under the magnetic head 110. Subsequently, as shown in FIG. 3B, the magnetic head 110 moves to a next recorded bit 84b. The recording magnetic field Hr is reversed; and a magnetization 86 of the next recorded bit 84b is switched upward. At this time, in the case where the temporal change of the recording magnetic field Hr is not sufficiently fast, the recording magnetic field Hr and the high frequency magnetic field Hm after the reversal are undesirably applied to the recorded bit 84a adjacent to the recorded bit 84b as well. Thereby, as shown in FIG. 3C, magnetization reversal of the magnetization 85 of the recorded bit 84a occurs; and a record error occurs.

By employing perpendicular magnetic recording, the width of the recorded bit can be set to be narrow; and the recording density can be increased. However, because the high frequency magnetic field Hm is applied continuously, interference of the high frequency magnetic field Hm occurs between the mutually-adjacent recorded bits; and record errors such as those of the reference example occur easily. When the recording density is increased, the problem of the record errors becomes large.

Figure 4A:
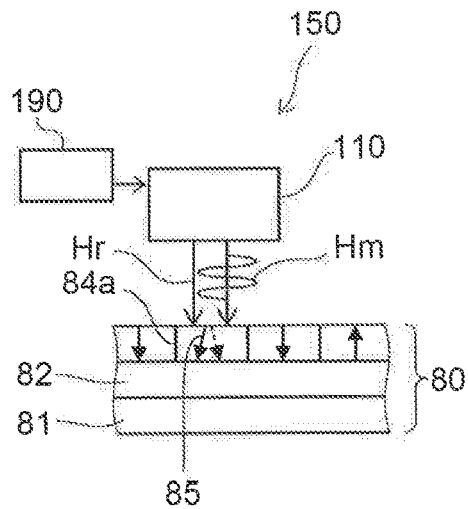
FIG. 4A to FIG. 4C are schematic views illustrating operations of the magnetic recording and reproducing device according to the first embodiment.
Figure 4B:
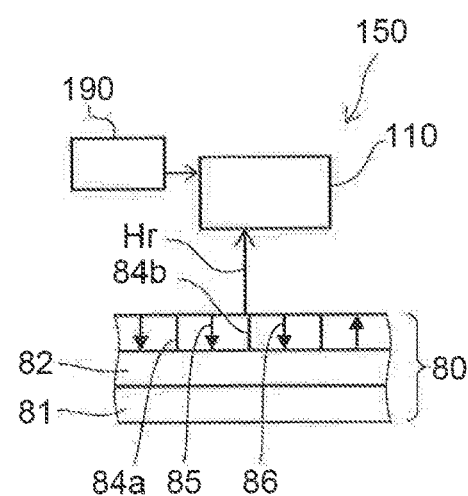
Figure 4C:
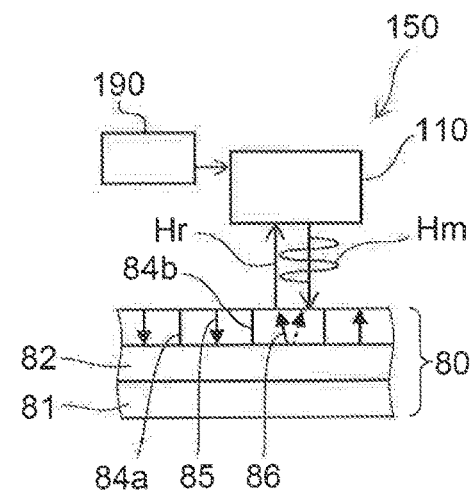

FIG. 4A to FIG. 4C are schematic views illustrating operations of the magnetic recording and reproducing device according to the first embodiment.

As shown in FIG. 4A, the controller 190 applies the high frequency magnetic field Hm and the recording magnetic field Hr to the magnetic recording medium 80 from the magnetic head 110. Thereby, assisted magnetization reversal of the recorded bit 84a directly under the magnetic head 110 is caused; and the magnetization 85 is switched downward. Subsequently, as shown in FIG. 4B, the magnetic head 110 moves to the next recorded bit 84b. The magnetic head 110 causes the recording magnetic field Hr to reverse and switches the magnetization 86 of the next recorded bit 84b upward. At this time, the intensity of the high frequency magnetic field Hm temporarily is set to be low. Thereby, the writing due to the recording magnetic field Hr after the reversal to the recorded bit 84a adjacent to the recorded bit 84b is suppressed. Unintended magnetization reversal of the magnetization 85 of the recorded bit 84a can be suppressed. Thereby, the occurrence of the record errors can be suppressed.

As shown in FIG. 4C, the magnetic head 110 increases the intensity of the high frequency magnetic field Hm at the appropriate timing and again applies the high frequency magnetic field Hm to the magnetic recording medium 80. Thereby, the magnetization 86 of the desired recorded bit 84b can be reversed. Using the high frequency magnetic field Hm, the transition position of the magnetic pattern of the information Inf can be stabilized. It is desirable to use the high frequency magnetic field Hm having a sufficiently short ramp-up time of the pulse.

In the magnetic recording and reproducing device 150 according to the embodiment, a pulse-modulated high frequency magnetic field Hm is generated with the recording magnetic field Hr of the information Inf from the magnetic head 110. For example, the generation period of the high frequency magnetic field Hm is synchronous with the write period of the information Inf. Thereby, the interference of the high frequency magnetic field Hm between the mutually-adjacent recorded bits does not occur easily. The occurrence of the record errors can be suppressed. In the embodiment, the record error described in reference to the reference example can be suppressed. According to the embodiment, stable recording operations are possible. Stable operations are obtained even for high recording densities. According to the embodiment, the recording density can be increased.

The description recited above corresponds to the case where the same information is recorded continuously. An example will now be described in which different information is recorded.

As shown in FIG. 1A and FIG. 1B, the recording magnetic field Hr further includes a third recording magnetic field Hr3. The third recording magnetic field Hr3 is a magnetic field corresponding to the second information Inf2. The second information Inf2 is different from the first information Inf1. For example, the second information Inf2 is "1" in the case where the first information Inf1 is "0." The relationship may be reversed. The second information Inf2 is recorded by the third recording magnetic field Hr3. At this time, the high frequency magnetic field Hm further includes a third signal magnetic field Hs3 and a third non-signal magnetic field Hn3.

The recording of the second information Inf2 is performed after recording the first information Inf1. The recording operation of the second information Inf2 is taken as a third operation. For example, the third operation is performed by the controller 190.

In other words, the controller 190 further implements the third operation. The third operation is implemented in a third information recording interval T3. The third information recording interval T3 includes a third recording interval Tr3 and a third non-recording interval Tn3. The third information recording interval T3 is continuous with the second information recording interval T2.

In the third operation (the third information recording interval T3), the controller 190 in the third recording interval Tr3 generates the third signal magnetic field Hs3 of a high frequency while generating the third recording magnetic field Hr3 from the magnetic head 110. The third signal magnetic field Hs3 has a third intensity IH3.

In the third operation, the controller 190 in the third non-recording interval Tn3 generates the third non-signal magnetic field Hn3 from the magnetic head 110. The third non-signal magnetic field Hn3 has an intensity IH3a. The intensity IH3a is lower than the third intensity IH3. In the third operation, the controller 190 in the third non-recording interval Tn3 causes the magnetic head 110 to further generate the third recording magnetic field Hr3. For example, the third recording interval Tr3 is after the third non-recording interval Tn3 in the third information recording interval T3.

In the example, a first other non-signal magnetic field Hno1, a second other non-signal magnetic field Hno2, and a third other non-signal magnetic field Hno3 are provided in the high frequency magnetic field Hm.

The first information recording interval T1 further includes the first other non-recording interval Tno1. The first other non-recording interval Tno1 is after the first recording interval Tr1. In the first operation, the controller 190 in the first other non-recording interval Tno1 generates the first other non-signal magnetic field Hno1 from the magnetic head 110. The first other non-signal magnetic field Hno1 has an intensity IH1b. The intensity IH1b is lower than the first intensity IH1.

The second information recording interval T2 further includes the second other non-recording interval Tno2. The second other non-recording interval Tno2 is after the second recording interval Tr2. In the second operation, the controller 190 in the second other non-recording interval Tno2 generates the second other non-signal magnetic field Hno2 from the magnetic head 110. The second other non-signal magnetic field Hno2 has an intensity IH2b. The intensity IH2b is lower than the second intensity IH2.

The third information recording interval T3 further includes a third other non-recording interval Tno3. The third other non-recording interval Tno3 is after the third recording interval Tr3. In the third operation, the controller 190 in the third other non-recording interval Tno3 generates the third other non-signal magnetic field Hno3 from the magnetic head 110. The third other non-signal magnetic field Hno3 has an intensity IH3b. The intensity IH3b is lower than the third intensity IH3.

The second information Inf2 is recorded by such a third operation.

In the embodiment, the frequency of the first signal magnetic field Hs1 is, for example, not less than 1 GHz and not more than 100 GHz. The frequency of the second signal magnetic field Hs2 is, for example, not less than 1 GHz and not more than 100 GHz. The frequency of the third signal magnetic field Hs3 is, for example, not less than 1 GHz and not more than 100 GHz.

In the embodiment, the intensity IH3a of the third non-signal magnetic field Hn3 is, for example, not more than ½ of the third intensity IH3 of the third signal magnetic field Hs3. More desirably, the intensity IH3a is not more than ¼ of the third intensity IH3. The intensity IH3a may be, for example, substantially zero.

Examples of the controller 190 and the magnetic recording medium 80 according to the embodiment will now be described.

As shown in FIG. 1A, the magnetic recording medium 80 includes a substrate 81, a foundation layer 82, and a magnetic recording layer 83. The foundation layer 82 is provided on the substrate 81. The magnetic recording layer 83 is provided on the foundation layer 82. In the magnetic recording medium 80, one bit of information (0 or 1) is recorded as the direction of the magnetization 85 of each recorded bit 84 of the magnetic recording layer 83. The magnetic recording layer 83 is, for example, a perpendicular magnetization film.

The material of the substrate 81 includes, for example, glass, aluminum, etc. The foundation layer 82 includes, for example, a soft under layer and an orientation control layer. For example, a material such as FeAlSi, CoZrNb, CoZrTa, CoFeB, CoNi, etc., is used as the soft under layer. For example, a material such as Ru, MgO, Cr, etc., is used as the orientation control layer. Other than such materials, the foundation layer 82 may include a layer necessary for the characteristic improvement of the magnetic recording medium 80.

For example, a material having a large perpendicular magnetic anisotropy energy is used as the magnetic recording layer 83. Thereby, high stability is obtained in the recording of the information. The material of the magnetic recording layer 83 includes, for example, at least one of a CoCr-based alloy, an FePt-based alloy, a CoPt-based alloy, a multilayer film of Co/Pt, a multilayer film of Co/Pd, or a RE-TM alloy (rare earth-iron group alloy). In the recording of the information, it is desirable for the condition of thermal stability expressed by $(K_u \cdot V)/(k_B \cdot T)$ to be, for example, greater than 60. "$K_u$" is the magnetic anisotropy energy. "V" is the activation volume. "$k_B$" is the Boltzmann constant. "T" is the absolute temperature.

The recording magnetic field Hr and the high frequency magnetic field Hm are applied from the magnetic head 110 to the magnetic recording medium 80. For example, a magnetic field in which the recording magnetic field Hr and the high frequency magnetic field Hm are synthesized may be applied to the magnetic recording medium 80. As described above, for example, the control of the applications of the magnetizations is performed by the controller 190.

The controller 190 includes a CPU (Central Processing Unit), memory, etc. The controller 190 applies the recording magnetic field (the write magnetic field) Hr and the pulse-modulated high frequency magnetic field Hm to the magnetic recording medium 80 from the magnetic head 110. For example, the controller 190 supplies the signal Ws to the magnetic head 110. The signal Ws corresponds to the information Inf to be recorded in the magnetic recording medium 80.

The magnetic head 110 opposes the magnetic recording medium 80. The magnetic head 110 generates the recording magnetic field Hr and generates the pulse-modulated high frequency magnetic field Hm according to the signal Ws. The frequency of the high frequency magnetic field Hm is higher than the frequency of the recording magnetic field Hr. The frequency of the high frequency magnetic field Hm is, for example, not less than 1 GHz and not more than 100 GHz. For example, the pulse width, the frequency, or the like is modulated as the pulse modulation.

Figure 5A:
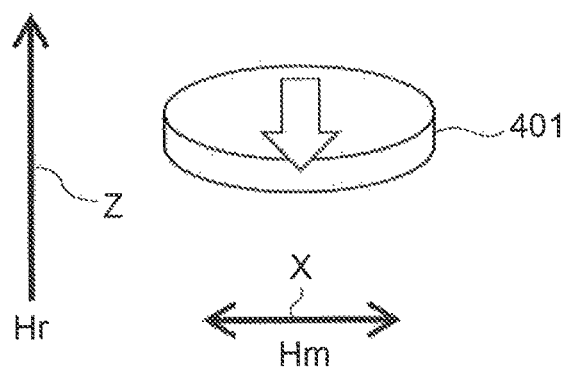
FIG. 5A and FIG. 5B illustrate simulation results relating to the magnetic recording and reproducing device.
Figure 5B:
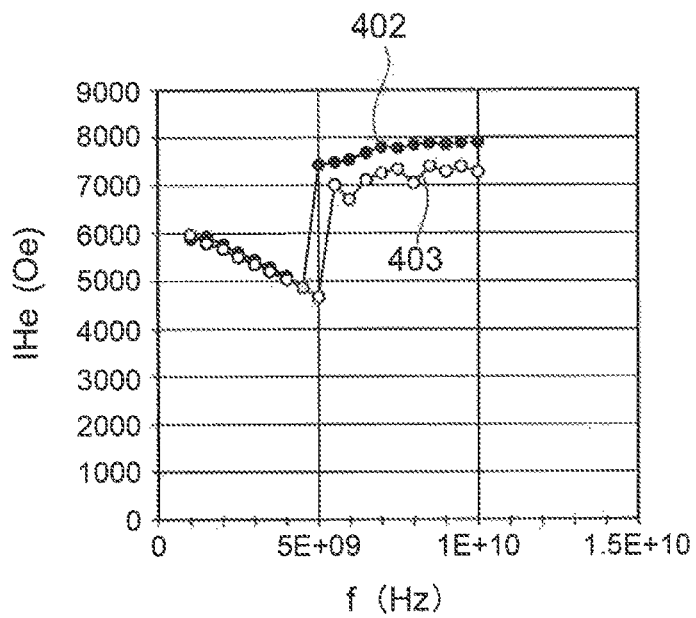

FIG. 5A and FIG. 5B illustrate simulation results relating to the magnetic recording and reproducing device.

FIG. 5A is a schematic view illustrating the magnetic body used in the simulation.

FIG. 5B is a graph illustrating the relationship between the magnetic switching field intensity of the magnetic body and the frequency of the high frequency magnetic field.

The magnetic body 401 has a disk configuration in the model of the simulation as shown in FIG. 5A. The diameter is 50 nanometers (nm); and the thickness is 5 nm. The effective perpendicular magnetic anisotropy of the magnetic body 401 is 7500 Oe. The high frequency magnetic field Hm and the recording magnetic field Hr are applied to the magnetic body 401. The high frequency magnetic field Hm has an oscillation component in the X-axis direction. The X-axis direction is aligned with the front surface (or the back surface) of the magnetic body 401. The recording magnetic field Hr is applied in the Z-axis direction. The Z-axis direction is orthogonal to the X-axis direction.

In FIG. 5B, the horizontal axis shows a frequency f (Hz) of the high frequency magnetic field Hm. The vertical axis shows a magnetic switching field intensity IHe (Oe) of the magnetic body. A characteristic 402 corresponds to the case where the high frequency magnetic field Hm of linearly polarized light is applied continuously to the magnetic body 401, In the example, the magnetic field intensity is 400 Oe. A characteristic 403 corresponds to the case where the pulse-modulated high frequency magnetic field Hm is applied to the magnetic body 401. The pulse width of the pulse modulation is 0.5 nanoseconds (ns). One interval when the high frequency magnetic field is applied is 0.5 ns; the interval when the high frequency magnetic field is not applied is 0.5 ns; and these intervals are repeated alternately. These characteristics illustrate the high frequency magnetic field frequency dependence of the magnetic switching field intensity IHe of the magnetic body 401 estimated from the simulation. The characteristic 402 and the characteristic 403 show the behavior of the microwave assisted magnetization reversal.

For the characteristic 402, the magnetic switching field intensity IHe decreases when the frequency f increases in the region where the frequency f is not more than about $4\times10^9$ Hz. The magnetic switching field intensity IHe increases abruptly when the frequency f exceeds about $4\times10^9$ Hz. The critical frequency of the characteristic 402 corresponds to about $4\times10^9$ Hz.

For the characteristic 403, the magnetic switching field intensity IHe decreases when the frequency f increases in the region where the frequency f is not more than about $5\times10^9$ Hz. The magnetic switching field intensity IHe increases abruptly when the frequency f exceeds about $5\times10^9$ Hz. The critical frequency of the characteristic 403 corresponds to about $5\times10^9$ Hz.

The position of the critical frequency is different between the characteristic 402 and the characteristic 403. Further, the magnetic switching field intensity IHe is different in the frequency band higher than the critical frequency. By using the pulse-modulated high frequency magnetic field Hm, it is possible to control the reversal condition of the magnetic recording medium 80.

By appropriately controlling the reversal condition of the magnetic recording medium 80, the recording density can be increased.

Figure 6:
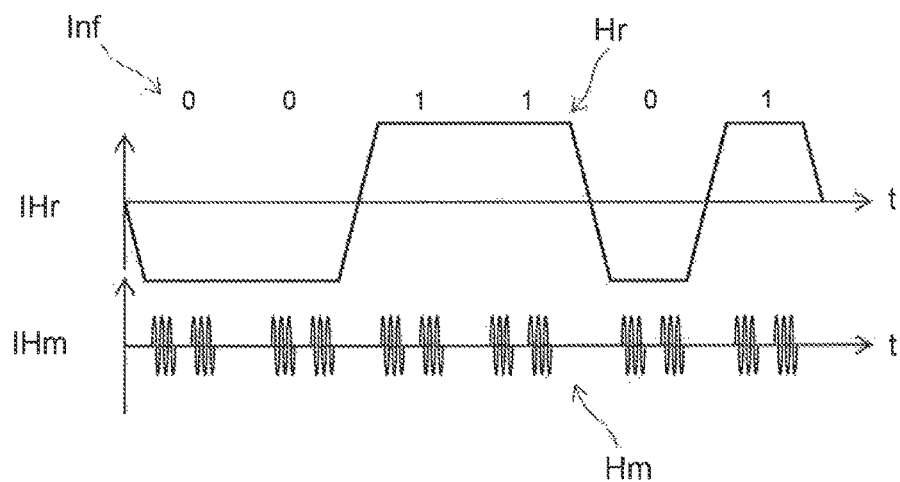
FIG. 6 is a schematic view illustrating another operation of the magnetic recording and reproducing device and the magnetic head according to the first embodiment.

FIG. 6 is a schematic view illustrating another operation of the magnetic recording and reproducing device and the magnetic head according to the first embodiment.

FIG. 6 is a timing chart illustrating the recording magnetic field and another high frequency magnetic field generated from the magnetic head according to the first embodiment.

As shown in FIG. 6, multiple pulse-modulated high frequency magnetic fields Hm that correspond to one recording period (1 bit) may be applied. In such a case, it is unnecessary for the parameters such as the pulse widths of the multiple high frequency magnetic fields Hm, the frequencies of the high frequency magnetic fields Hm, etc., to be constant.

In the magnetic recording and reproducing device 150 according to the embodiment, the recording magnetic field Hr of the information Inf and the pulse-modulated high frequency magnetic field Hm are generated from the magnetic head 110. For example, the generation period of the high frequency magnetic field Hm is synchronous with the write period of the information Inf. Thereby, the record errors are suppressed; and a stable recording operation can be performed. In the example as well, the recording density can be increased.

Figure 7:
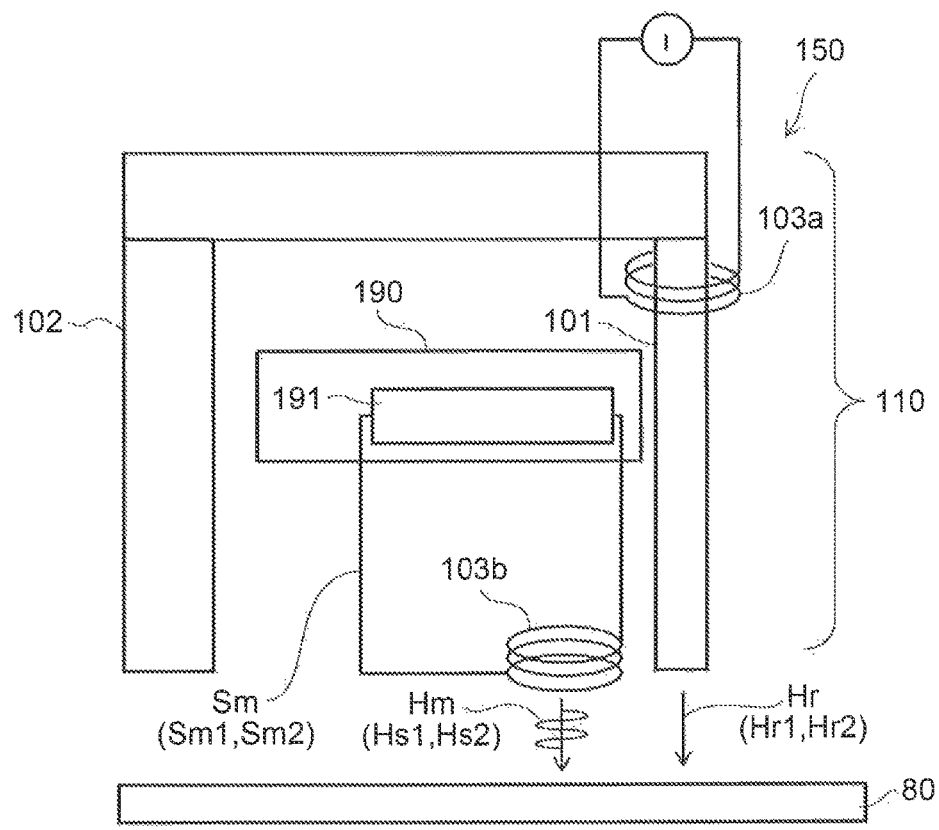
FIG. 7 is a schematic view illustrating the magnetic recording and reproducing device according to the first embodiment.

FIG. 7 is a schematic view illustrating the magnetic recording and reproducing device according to the first embodiment.

The magnetic recording and reproducing device 150 according to the embodiment includes the magnetic head 110, the controller 190, and the magnetic recording medium 80. The magnetic head 110 includes a major pole 101, a return path 102, a first coil 103a, and a second coil 103b. The controller 190 includes a high frequency signal generator 191.

The first coil 103a causes the major pole 101 to generate the first recording magnetic field Hr1 and the second recording magnetic field Hr2. The second coil 103b generates the first signal magnetic field Hs1 and the second signal magnetic field Hs2. The high frequency signal generator 191 in the first recording interval Tr1 supplies, to the second coil 103b, a first electrical signal Sm1 of a high frequency corresponding to the first signal magnetic field Hs1. The high frequency signal generator 191 supplies, to the second coil 103b, a second electrical signal Sm2 of a high frequency corresponding to the second signal magnetic field Hs2.

The magnetic head 110 applies the recording magnetic field Hr to the magnetic recording medium 80. The major pole 101 is caused to generate the recording magnetic field Hr by energizing the first coil 103a. The magnetic head 110 applies the pulse-modulated high frequency magnetic field Hm to the magnetic recording medium 80. The high frequency signal generator 191 generates an electrical signal Sm (the high frequency signal) of a high frequency that is pulse-modulated and supplies the electrical signal Sm (the high frequency signal) to the second coil 103b. The second coil 103b generates the pulse-modulated high frequency magnetic field Hm according to the electrical signal Sm (the high frequency signal). The high frequency magnetic field Hm includes, for example, the first signal magnetic field Hs1 and the second signal magnetic field Hs2.

Figure 8:
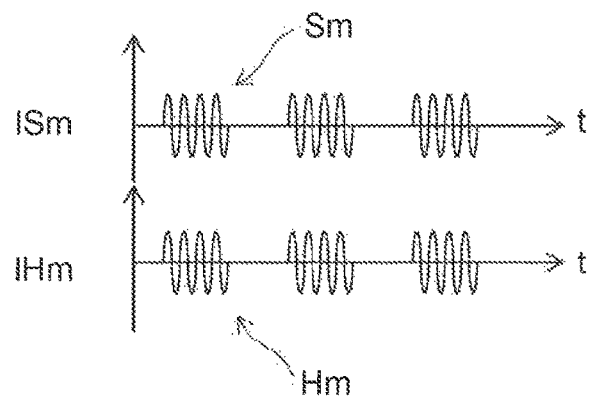
FIG. 8 is a graph illustrating waveforms of the high frequency magnetic field and the high frequency signal.

FIG. 8 is a graph illustrating waveforms of the high frequency magnetic field and the high frequency signal.

In FIG. 8, the horizontal axis shows the time t. The vertical axis shows the intensity IHm of the high frequency magnetic field Hm or an intensity ISm of the electrical signal Sm (the high frequency signal).

It is desirable to appropriately design the high frequency transmission characteristics from the high frequency signal generator 191 to the second coil 103b. Thereby, as shown in FIG. 8, the waveform of the high frequency magnetic field Hm can be substantially the same as the waveform of the electrical signal Sm (the high frequency signal).

Thus, according to the embodiment, the recording magnetic field Hr of the information Inf and the pulse-modulated high frequency magnetic field Hm are generated from the magnetic head 110. Thereby, unintended magnetization reversal when recording the information Inf in the magnetic recording medium 80 can be suppressed. Thereby, the record errors are suppressed; and a stable recording operation can be performed.

Second Embodiment

Figure 9:
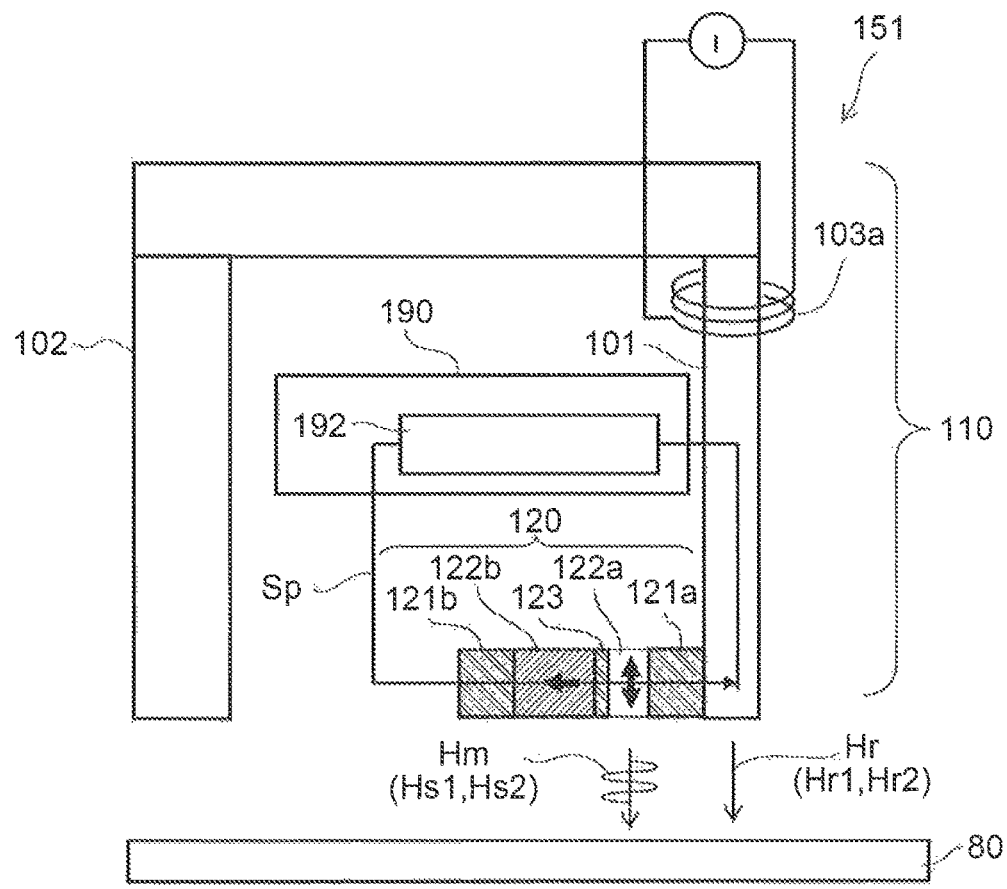
FIG. 9 is a schematic view illustrating a magnetic recording and reproducing device according to a second embodiment.

FIG. 9 is a schematic view illustrating a magnetic recording and reproducing device according to a second embodiment.

The magnetic recording and reproducing device 151 according to the embodiment includes the magnetic head 110, the controller 190, and the magnetic recording medium 80. The magnetic head 110 includes the major pole 101, the return path 102, the first coil 103a, and a stacked body 120. The controller 190 includes a pulse signal generator 192.

The major pole 101 generates the first signal magnetic field Hs1 and the second signal magnetic field Hs2. For example, the stacked body 120 functions as a spin torque oscillator. The stacked body 120 includes a first electrode 121a, a second electrode 121b, a first magnetic layer 122a, a second magnetic layer 122b, and an intermediate layer 123. The first magnetic layer 122a is provided between the first electrode 121a and the second electrode 121b. The second magnetic layer 122b is provided between the first magnetic layer 122a and the second electrode 121b. The intermediate layer 123 is provided between the first magnetic layer 122a and the second magnetic layer 122b. The high frequency magnetic field Hm is emitted from the stacked body 120 according to the current flowing between the first electrode 121a and the second electrode 121b.

The magnetic head 110 applies the recording magnetic field Hr to the magnetic recording medium 80. The major pole 101 is caused to generate the recording magnetic field Hr by energizing the first coil 103a. The magnetic head 110 applies the pulse-modulated high frequency magnetic field Hm to the magnetic recording medium 80. In the example, the stacked body 120 functions as a spin torque oscillator. The pulse-modulated high frequency magnetic field Hm is generated by using such a stacked body 120.

For example, the first magnetic layer 122a functions as a magnetization free layer. The orientation of the magnetization is rotatable in the first magnetic layer 122a. The first magnetic layer 122a is, for example, an in-plane magnetization film. The first magnetic layer 122a includes, for example, NiFe, CoFe, etc. The saturation magnetizations of these materials are high. Thereby, for example, a high magnetic field in the oscillation can be generated. A material such as Al, Si, B, etc., may be included as the first magnetic layer 122a. The first magnetic layer 122a may include layers of multiple materials that are stacked. For example, the anisotropic magnetic field is adjusted. For example, the saturation magnetic flux density is adjusted.

For example, the second magnetic layer 122b functions as a fixed magnetic layer. The orientation of the magnetization is substantially fixed in the second magnetic layer 122b. The second magnetic layer 122b has, for example, an easy axis in the surface normal direction. The second magnetic layer 122b includes, for example, a Pt-based magnetic body such as CoPt, FePt, etc. The second magnetic layer 122b may include, for example, a CoCr-based magnetic body. The second magnetic layer 122b may include, for example, a rare-earth element-based magnetic body such as TbFe, TeCo, etc.

For example, the intermediate layer 123 functions as a spin transport layer. The intermediate layer 123 is, for example, a nonmagnetic body. The intermediate layer 123 includes a material that can transport spin torque. The intermediate layer 123 includes, for example, a metal such as Cu, etc. The intermediate layer 123 may include, for example, an insulator material such as MgO, etc.

When a current is caused to flow in the stacked body 120 having such a structure, a spin current from the second magnetic layer 122b toward the first magnetic layer 122a is excited. The magnetization of the first magnetic layer 122a oscillates; and the high frequency magnetic field Hm is generated. By causing the current to flow in the stacked body 120, a magnetization oscillation is generated; and accordingly, the high frequency magnetic field Hm is generated. The structure of the stacked body 120 is not limited to the example of FIG. 9. The pulse signal generator 192 supplies the current pulse Sp between the first electrode 121a and the second electrode 121b. Pulse driving of the stacked body 120 is caused by the current pulse Sp; and the stacked body 120 generates the pulse-modulated high frequency magnetic field Hm. The high frequency magnetic field Hm is applied to the magnetic recording medium 80. The high frequency magnetic field Hm includes, for example, the first signal magnetic field Hs1, the second signal magnetic field Hs2, etc.

Figure 10:
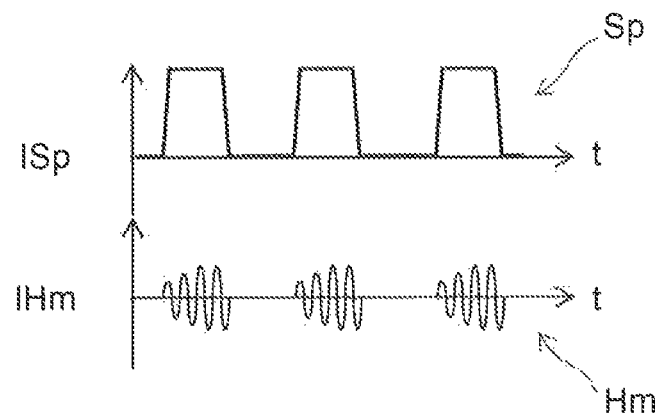
FIG. 10 is a graph illustrating waveforms of the high frequency magnetic field and the current pulse.
Figure 11:
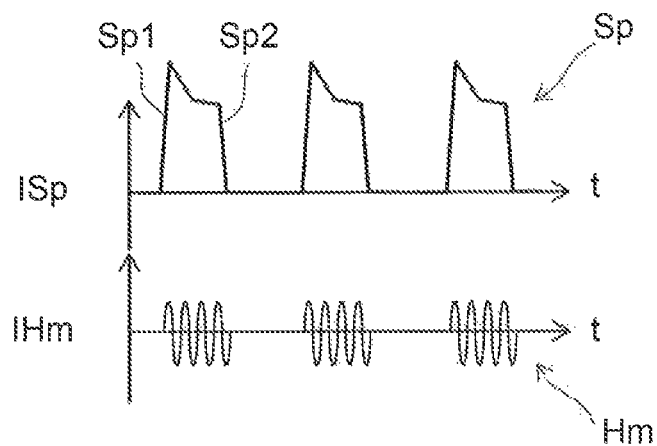
FIG. 11 is a graph illustrating waveforms of the high frequency magnetic field and the current pulse.

FIG. 10 and FIG. 11 are graphs illustrating waveforms of the high frequency magnetic field and the current pulse.

In these figures, the horizontal axis shows the time t. The vertical axis shows the intensity IHm of the high frequency magnetic field Hm or an intensity ISp of the current pulse Sp.

The frequency component of the current pulse Sp supplied to the stacked body 120 is low compared to the frequency component of the electrical signal Sm (the high frequency signal) described above. Therefore, the limit of the band for the high frequency characteristics of the transmission line is relaxed. The band may be a narrow band. The stacked body 120 includes the first magnetic layer 122a that is an in-plane magnetization film, and the second magnetic layer 122b that is a perpendicular magnetization film. The oscillation frequency of the stacked body 120 is proportional to the applied current. Therefore, the frequency of the high frequency magnetic field Hm can be controlled by adjusting the amount of current.

In the stacked body 120, it takes time for the oscillation of the magnetization to ramp-up from the application of the current. For example, as shown in FIG. 10, the ramp-up of the high frequency magnetic field Hm is delayed with respect to the ramp-up of the current pulse Sp. The ramp-up time is dependent on the intensity of the current. The ramp-up time is short when the current is large.

In such a case, for example, as shown in FIG. 11, the current in the ramp-up of the waveform of the current pulse Sp is set to be larger than the current in the ramp-down of the waveform of the current pulse Sp. The current pulse Sp includes a former interval signal Sp1 and a latter interval signal Sp2. The latter interval signal Sp2 is the signal after the former interval signal Sp1. The intensity of the former interval signal Sp1 is higher than the intensity of the latter interval signal Sp2. A pulse waveform is used in which the signal strength (the current intensity) in the ramp-up is large. Thereby, the ramp-up time of the high frequency magnetic field Hm of the stacked body 120 can be short.

Third Embodiment

Figure 12:
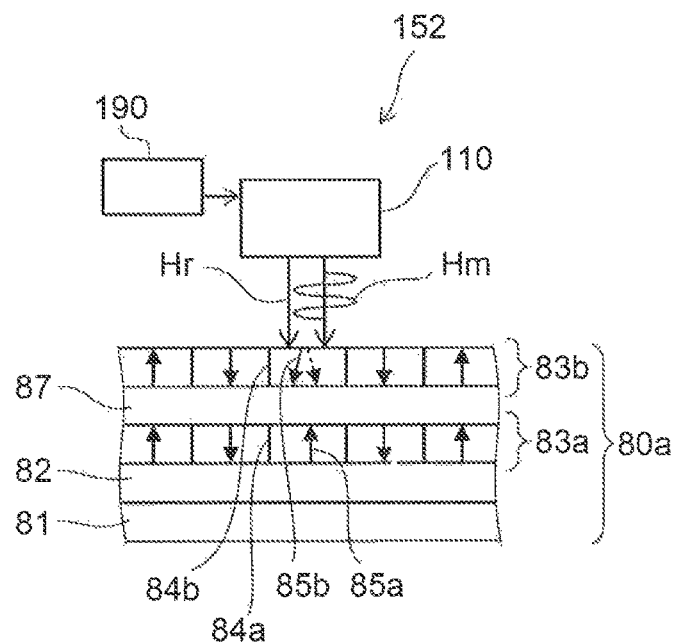
FIG. 12 is a schematic view illustrating a magnetic recording and reproducing device according to a third embodiment.

FIG. 12 is a schematic view illustrating a magnetic recording and reproducing device according to a third embodiment.

The magnetic recording and reproducing device 152 according to the embodiment includes the magnetic head 110, the controller 190, and a magnetic recording medium 80a. The magnetic recording medium 80a includes the substrate 81, the foundation layer 82, a first magnetic recording layer 83a, a second magnetic recording layer 83b, and a separation layer 87.

The foundation layer 82 is provided between the substrate 81 and the first magnetic recording layer 83a. The separation layer 87 is provided between the first magnetic recording layer 83a and the second magnetic recording layer 83b. In the example, the foundation layer 82 is provided on the substrate 81. The first magnetic recording layer 83a is provided on the foundation layer 82. The separation layer 87 is provided on the first magnetic recording layer 83a. The second magnetic recording layer 83b is provided on the separation layer 87. The second magnetic recording layer 83b is disposed between the first magnetic recording layer 83a and the magnetic head 110.

The first magnetic recording layer 83a and the second magnetic recording layer 83b are separated from each other by the separation layer 87. The separation layer 87 includes, for example, a nonmagnetic metal material, a nonmagnetic insulating material, etc. The nonmagnetic metal material includes, for example, Ti, Cr, Ta, etc. The nonmagnetic insulating material includes, for example, $MgO_x$, etc. The separation layer 87 may include a stacked film in which Ti, Cr, Ta, $MgO_x$, etc., are combined. For example, the separation layer 87 breaks the magnetic coupling due to the exchange interaction between the recorded bits 84a and 84b. The separation layer 87 may control the crystal orientations of the first magnetic recording layer 83a and the second magnetic recording layer 83b.

Two magnetic layers are provided in the magnetic recording medium 80a in the example. The number of the magnetic recording layers (and separation layers) is arbitrary. In the example, the boundaries of the recorded bits 84a of the first magnetic recording layer 83a and the boundaries of the recorded bits 84b of the second magnetic recording layer 83b overlap each other in the thickness direction of the layers. At least one of the position or the size of the recorded bits 84 may be different between the multiple magnetic recording layers.

For example, the first magnetic recording layer 83a and the second magnetic recording layer 83b have mutually-different FMR frequencies. Therefore, the frequency of the high frequency magnetic field Hm at which the assist effect is obtained is different between the first magnetic recording layer 83a and the second magnetic recording layer 83b. Utilizing this difference, one of the multiple magnetic recording layers can be selected and magnetization reversal can be performed.

For example, the controller 190 controls the frequency of the high frequency magnetic field Hm according to the FMR frequencies of the first magnetic recording layer 83a and the second magnetic recording layer 83b. For example, the first magnetic recording layer 83a has a first FMR frequency. The second magnetic recording layer 83b has a second FMR frequency that is higher than the first FMR frequency. In such a case, the frequency of the first signal magnetic field Hs1 when recording the first information Inf1 in the first magnetic recording layer 83a is lower than the frequency of the first signal magnetic field Hs1 when recording the first information Inf1 in the second magnetic recording layer 83b. The second magnetic recording layer 83b has the second FMR frequency that is lower than the first FMR frequency. In such a case, the frequency of the first signal magnetic field Hs1 when recording the first information Inf1 in the first magnetic recording layer 83a is higher than the frequency of the first signal magnetic field Hs1 when recording the first information Inf1 in the second magnetic recording layer 83b. The frequency of the first signal magnetic field Hs1 when recording the first information Inf1 in the first magnetic recording layer 83a is, for example, not more than 0.5 times the first FMR frequency. The frequency of the first signal magnetic field Hs1 when recording the first information Inf1 in the second magnetic recording layer 83b is, for example, not more than 0.5 times the second FMR frequency.

In the example of FIG. 12, the pulse-modulated high frequency magnetic field Hm excites a magnetization 85b of the recorded bit 84b directly under the magnetic head 110. Then, the magnetization 85b is switched downward by simultaneously applying the recording magnetic field Hr. At this time, the pulse-modulated high frequency magnetic field Hm and the recording magnetic field Hr are applied similarly to the recorded bit 84a directly under the recorded bit 84b as well. At this time, the magnetization oscillation is not excited sufficiently due to the difference of the FMR frequencies. The magnetization reversal of a magnetization 85a of the recorded bit 84a is suppressed.

Figure 13:
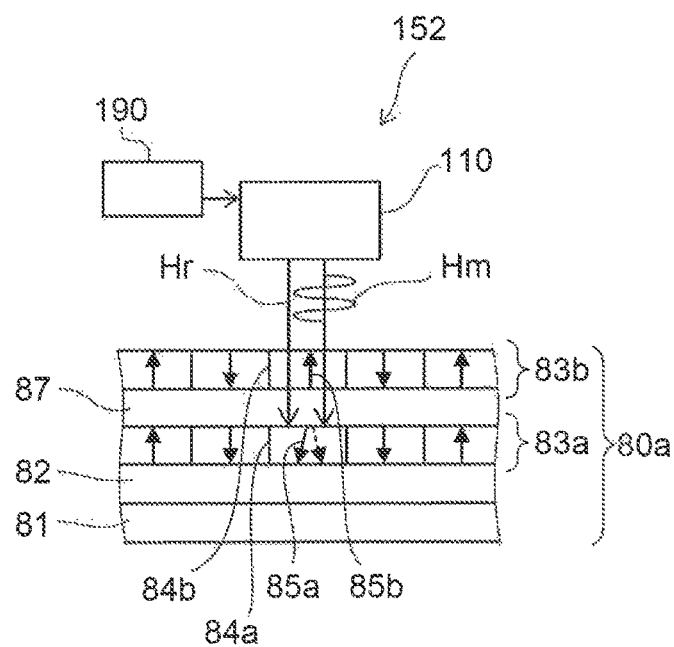
FIG. 13 is a schematic view illustrating the magnetic recording and reproducing device according to the third embodiment.

FIG. 13 is a schematic view illustrating the magnetic recording and reproducing device according to the third embodiment.

In the example of FIG. 13, the pulse-modulated high frequency magnetic field Hm excites the magnetization 85a of the recorded bit 84a directly under the magnetic head 110. The magnetization 85a is switched downward by simultaneously applying the recording magnetic field Hr. At this time, the pulse-modulated high frequency magnetic field Hm and the recording magnetic field Hr are applied similarly to the recorded bit 84b directly above the recorded bit 84a. At this time, the magnetization oscillation is not excited sufficiently due to the difference of the FMR frequencies. The magnetization reversal of the magnetization 85b of the recorded bit 84b is suppressed.

The frequency of the pulse-modulated high frequency magnetic field Hm is controlled in the microwave assisted magnetization reversal of such a multilayer magnetic recording medium 80a. The control of the frequency is performed according to the FMR frequencies of the multiple magnetic recording layers. One of the multiple magnetic recording layers is selectively recorded.

Figure 14A:
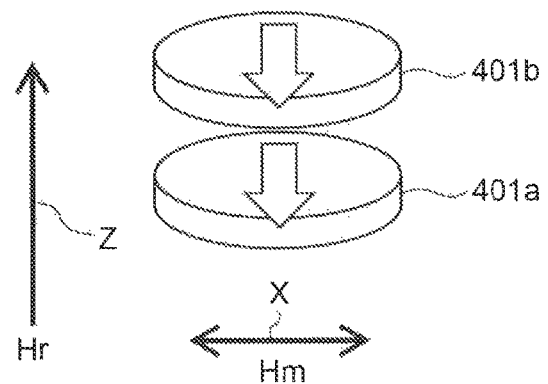
FIG. 14A to FIG. 14C illustrate simulation results according to the third embodiment.
Figure 14B:
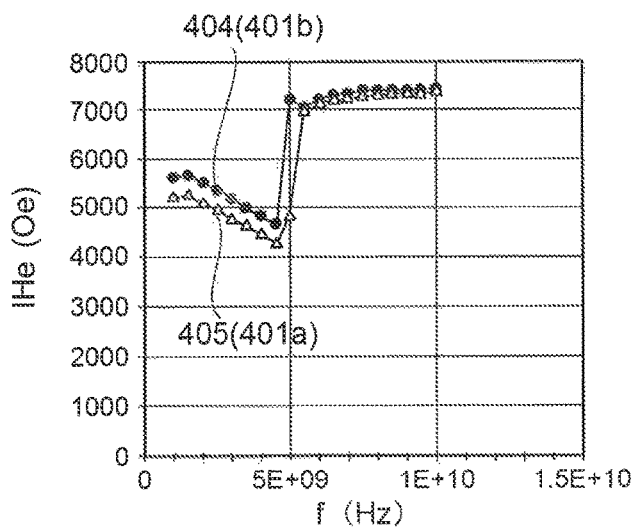
Figure 14C:
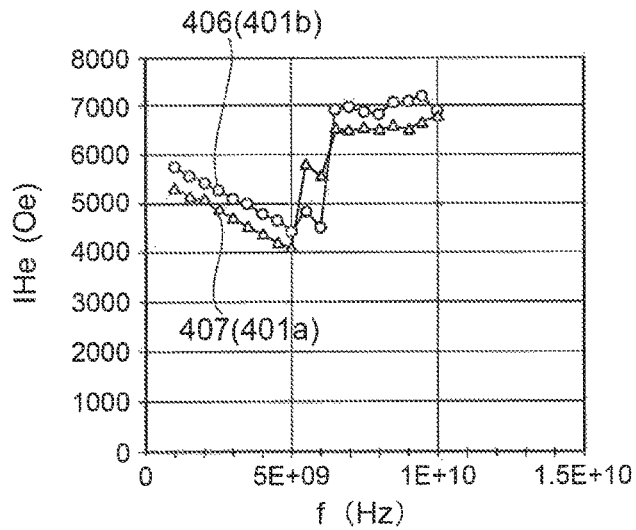

FIG. 14A to FIG. 14C illustrate simulation results according to the third embodiment.

FIG. 14A is a schematic view illustrating the magnetic body used in the simulation. FIG. 14B is a graph illustrating the relationship between the magnetic switching field intensity IHe and the frequency f in the case where the high frequency magnetic field is applied continuously. FIG. 14C is a graph illustrating the relationship between the magnetic switching field intensity IHe and the frequency f estimated from the simulation in the case where the pulse-modulated high frequency magnetic field is applied.

A first magnetic body 401a has a disk configuration in the model of the simulation as shown in FIG. 14A. The diameter is 50 nm; and the thickness is 5 nm. The effective perpendicular magnetic anisotropy of the first magnetic body 401a is 6500 (Oe). A second magnetic body 401b also has a disk configuration. The diameter is 50 nm; and the thickness is 5 nm. The effective perpendicular magnetic anisotropy of the second magnetic body 401b is 7500 (Oe). The high frequency magnetic field Hm and the recording magnetic field Hr are applied to the first magnetic body 401a and the second magnetic body 401b. The high frequency magnetic field Hm has an oscillation component in the X-axis direction. The recording magnetic field Hr is applied in the Z-axis direction.

In FIG. 14B and FIG. 14C, the horizontal axis shows the frequency f (Hz) of the high frequency magnetic field Hm. The vertical axis shows the magnetic switching field intensity IHe (Oe) of the magnetic body. A characteristic 404 corresponds to the case where a first high frequency magnetic field Hm is applied to the second magnetic body 401b. The intensity of the first high frequency magnetic field Hm is 400 (Oe); and the first high frequency magnetic field Hm is linearly polarized light and is continuous. A characteristic 405 corresponds to the case where the first high frequency magnetic field Hm is applied to the first magnetic body 401a. A characteristic 406 corresponds to the case where a second high frequency magnetic field Hm is applied to the second magnetic body 401b. The second high frequency magnetic field Hm is pulse-modulated with a duration of 0.5 ns; and the period is 2 nm. A characteristic 407 corresponds to the case where the second high frequency magnetic field Hm is applied to the first magnetic body 401a.

In the case where the high frequency magnetic field Hm is applied continuously as shown in FIG. 14B, the magnetic switching field intensity IHe (corresponding to the coercivity) of the first magnetic body 401a is lower than the magnetic switching field intensity IHe of the second magnetic body 401b. Regardless of the frequency of the high frequency magnetic field Hm, the first magnetic body 401a reverses earlier than the second magnetic body 401b. In the case where the high frequency magnetic field Hm is applied continuously, for example, magnetization reversal of only the second magnetic body 401b cannot be caused selectively using the FMR frequency.

Conversely, as shown in FIG. 14C, in the case where the pulse-modulated high frequency magnetic field Hm is applied, the magnetic switching field intensity IHe of the second magnetic body 401b is higher than the magnetic switching field intensity IHe of the first magnetic body 401a when the high frequency magnetic field Hm is a first frequency f1 (Hz). On the other hand, when the high frequency magnetic field Hm is a second frequency f2 (Hz), the magnetic switching field intensity IHe of the second magnetic body 401b is lower than the magnetic switching field intensity IHe of the first magnetic body 401a. It is possible to select the first magnetic body 401a and the second magnetic body 401b and perform magnetization reversal using the first frequency f1 and the second frequency f2.

Figure 15:
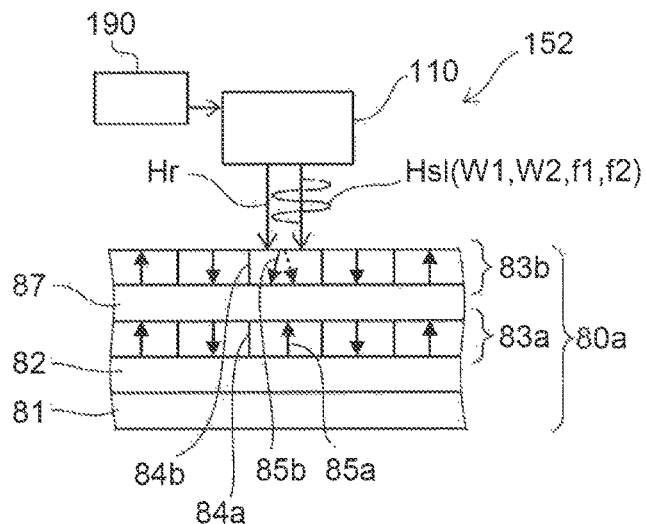
FIG. 15 is a schematic view illustrating the magnetic recording and reproducing device according to the third embodiment.

FIG. 15 is a schematic view illustrating the magnetic recording and reproducing device according to the third embodiment.

As shown in FIG. 15, the magnetic recording medium 80a includes the first magnetic recording layer 83a and the second magnetic recording layer 83b. The first signal magnetic field Hs1 has a first pulse width W1, a second pulse width W2, the first frequency f1, and the second frequency f2. For the first frequency f1 (and the first pulse width W1), the magnetic switching field intensity IHe of the first magnetic recording layer 83a is lower than the magnetic switching field intensity IHe of the second magnetic recording layer 83b. For the second frequency f2 (and the second pulse width W2), the magnetic switching field intensity IHe of the first magnetic recording layer 83a is higher than the magnetic switching field intensity IHe of the second magnetic recording layer 83b. The controller 190 sets the frequency of the first signal magnetic field Hs1 to the first frequency f1 when recording the first information Inf1 in the first magnetic recording layer 83a. Magnetization reversal of the first magnetic recording layer 83a occurs for the first frequency f1. The controller 190 sets the frequency of the first signal magnetic field Hs1 to the second frequency f2 when recording the first information Inf1 in the second magnetic recording layer 83b. Magnetization reversal of the second magnetic recording layer 83b occurs for the second frequency f2. Thus, the magnetization reversal of one of the multiple magnetic recording layers can be caused selectively by controlling the pulse width and the frequency of the high frequency magnetic field Hm.

According to the embodiment, by utilizing the pulse-modulated high frequency magnetic field Hm, magnetization reversal of one of the multiple magnetic recording layers can be caused selectively. The pulse width and the frequency of the pulse-modulated high frequency magnetic field Hm may be controlled according to the magnetic recording layer. Further, stable magnetization reversal is obtained.

Fourth Embodiment

Figure 16:
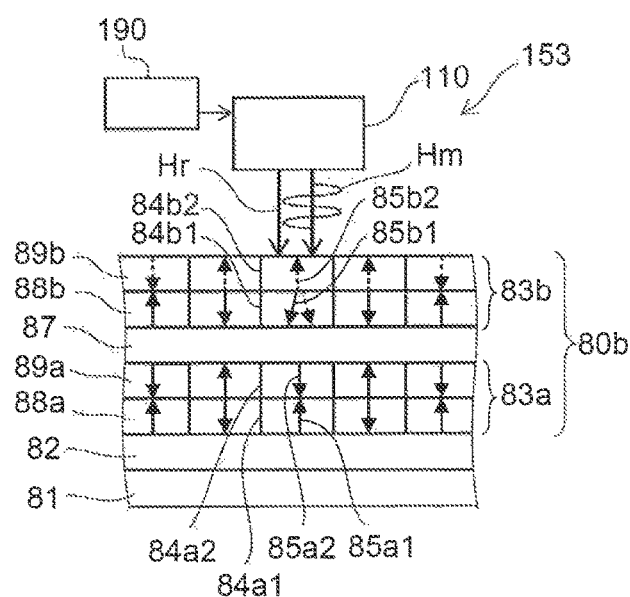
FIG. 16 is a schematic view illustrating a magnetic recording and reproducing device according to a fourth embodiment.

FIG. 16 is a schematic view illustrating a magnetic recording and reproducing device according to a fourth embodiment.

The magnetic recording and reproducing device 153 according to the embodiment includes the magnetic head 110, the controller 190, and a magnetic recording medium 80b. The magnetic recording medium 80b includes the substrate 81, the foundation layer 82, the first magnetic recording layer 83a, the second magnetic recording layer 83b, and the separation layer 87.

The foundation layer 82 is provided between the substrate 81 and the first magnetic recording layer 83a. The separation layer 87 is provided between the first magnetic recording layer 83a and the second magnetic recording layer 83b. In the example, the foundation layer 82 is provided on the substrate 81. The first magnetic recording layer 83a is provided on the foundation layer 82. The separation layer 87 is provided on the first magnetic recording layer 83a. The second magnetic recording layer 83b is provided on the separation layer 87.

The first magnetic recording layer 83a includes a first hard layer 88a and a first soft layer 89a. The first hard layer 88a includes, for example, at least one of a CoCr-based alloy, an FePt-based alloy, a CoPt-based alloy, a multilayer film of Co/Pt, a multilayer film of Co/Pd, or a RE-TM alloy (rare earth-iron group alloy). In the recording of the information, for example, it is desirable for the condition of the thermal stability expressed by $(K_u \cdot V)/(k_B \cdot T)$ to be greater than 60. The first soft layer 89a includes, for example, a Co/Pt multilayer film, a Co/Pd multilayer film, Co, Fe, etc.

The second magnetic recording layer 83b includes a second hard layer 88b and a second soft layer 89b. The second hard layer 88b and the second soft layer 89b are antiferromagnetically coupled. A magnetization 85b2 of a recorded bit 84b2 of the second soft layer 89b spontaneously is switched by the effective magnetic field due to the antiferromagnetic coupling to the perpendicular direction that is the opposite of a magnetization 85b1 of a recorded bit 84b1 of the second hard layer 88b. As long as such a condition is satisfied, the second soft layer 89b may be an in-plane magnetization film or a perpendicular magnetization film.

This is similar for the first magnetic recording layer 83a as well. The first hard layer 88a and the first soft layer 89a are antiferromagnetically coupled. A magnetization 85a2 of a recorded bit 84a2 of the first soft layer 89a spontaneously is switched by the effective magnetic field due to the antiferromagnetic coupling to the perpendicular direction that is the opposite of a magnetization 85a1 of a recorded bit 84a1 of the first hard layer 88a.

In the residual state, the leakage magnetic fields from the first hard layer 88a and the first soft layer 89a and the leakage magnetic fields from the second hard layer 88b and the second soft layer 89b act to cancel each other; and the leakage magnetic field acting on the surrounding bits is weakened. Thereby, the change of the magnetization reversal conditions that are dependent on the state of the surrounding recorded bits becomes small; and stable magnetization reversal can be performed.

The leakage magnetic field is most reduced in the case where the magnetic volume of the first hard layer 88a and the magnetic volume of the first soft layer 89a are equal. If the leakage magnetic field is reduced to perform the write operation to be sufficiently stable, the magnetic volume of the first hard layer 88a may be different from the magnetic volume of the first soft layer 89a. In such a case, the size relationship of the magnetic volumes is arbitrary. The relationship between the magnetic volume of the second hard layer 88b and the magnetic volume of the second soft layer 89b also is similar.

The pulse-modulated high frequency magnetic field Hm and the recording magnetic field Hr are applied to the recorded bits 84b1 and 84b2 directly under the magnetic head 110. At this time, the magnetization oscillation of the second hard layer 88b is excited; and writing is performed. Accordingly, the second soft layer 89b spontaneously is oriented in the direction that is the opposite of the second hard layer 88b. At this time, the pulse-modulated high frequency magnetic field Hm and the recording magnetic field Hr are applied also to the recorded bits 84a1 and 84a2 directly under the magnetic head 110. However, for example, the FMR frequency is different between the first magnetic recording layer 83a and the second magnetic recording layer 83b. Therefore, the magnetization reversal is suppressed. Thereby, it is possible to write to only the second magnetic recording layer 83b. Similarly, the high frequency magnetic field Hm in which the frequency and the pulse width are controlled is applied to cause the magnetization reversal of only the first magnetic recording layer 83a. Thereby, the magnetization reversal of only the first magnetic recording layer 83a can be caused.

For example, in the structure in which the perpendicular magnetization films shown in FIG. 12 are stacked, a leakage magnetic field is generated in the vertical direction between the recorded bit 84a of the first magnetic recording layer 83a and the recorded bit 84b of the second magnetic recording layer 83b. There is a problem that the conditions of the magnetization reversal are dependent on the magnetization directions of the surrounding recorded bits and undesirably change greatly due to the leakage magnetic field. As in the magnetic recording and reproducing device 153, such a problem can be suppressed by including multiple magnetic bodies in which the magnetic recording layers are antiferromagnetically coupled.

Fifth Embodiment

Figure 17:
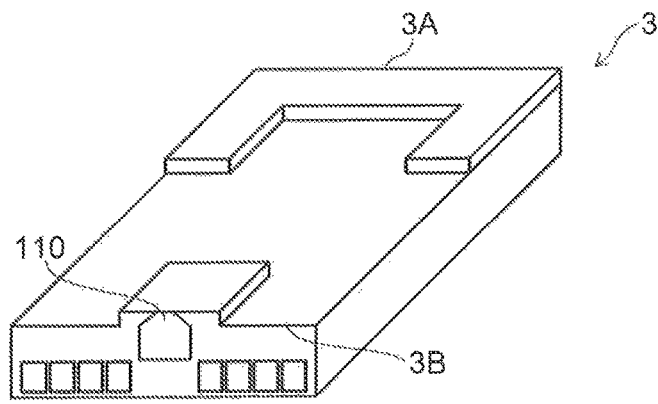
FIG. 17 is a schematic perspective view illustrating a portion of a magnetic recording and reproducing device according to a fifth embodiment.

FIG. 17 is a schematic perspective view illustrating a portion of a magnetic recording and reproducing device according to the fifth embodiment.

FIG. 17 illustrates a head slider to which a magnetic head is mounted.

The magnetic head 110 is mounted to a head slider 3. The head slider 3 includes, for example, $Al_2O_3/TiC$, etc. The head slider 3 moves relative to the magnetic recording medium 80 while flying over or contacting the magnetic recording medium 80.

The head slider 3 has, for example, an air inflow side 3A and an air outflow side 3B. The magnetic head 110 is disposed at the side surface of the air outflow side 3B of the head slider 3 or the like. Thereby, the magnetic head 110 that is mounted to the head slider 3 moves relative to the magnetic recording medium 80 while flying over or contacting the magnetic recording medium 80.

Figure 18:
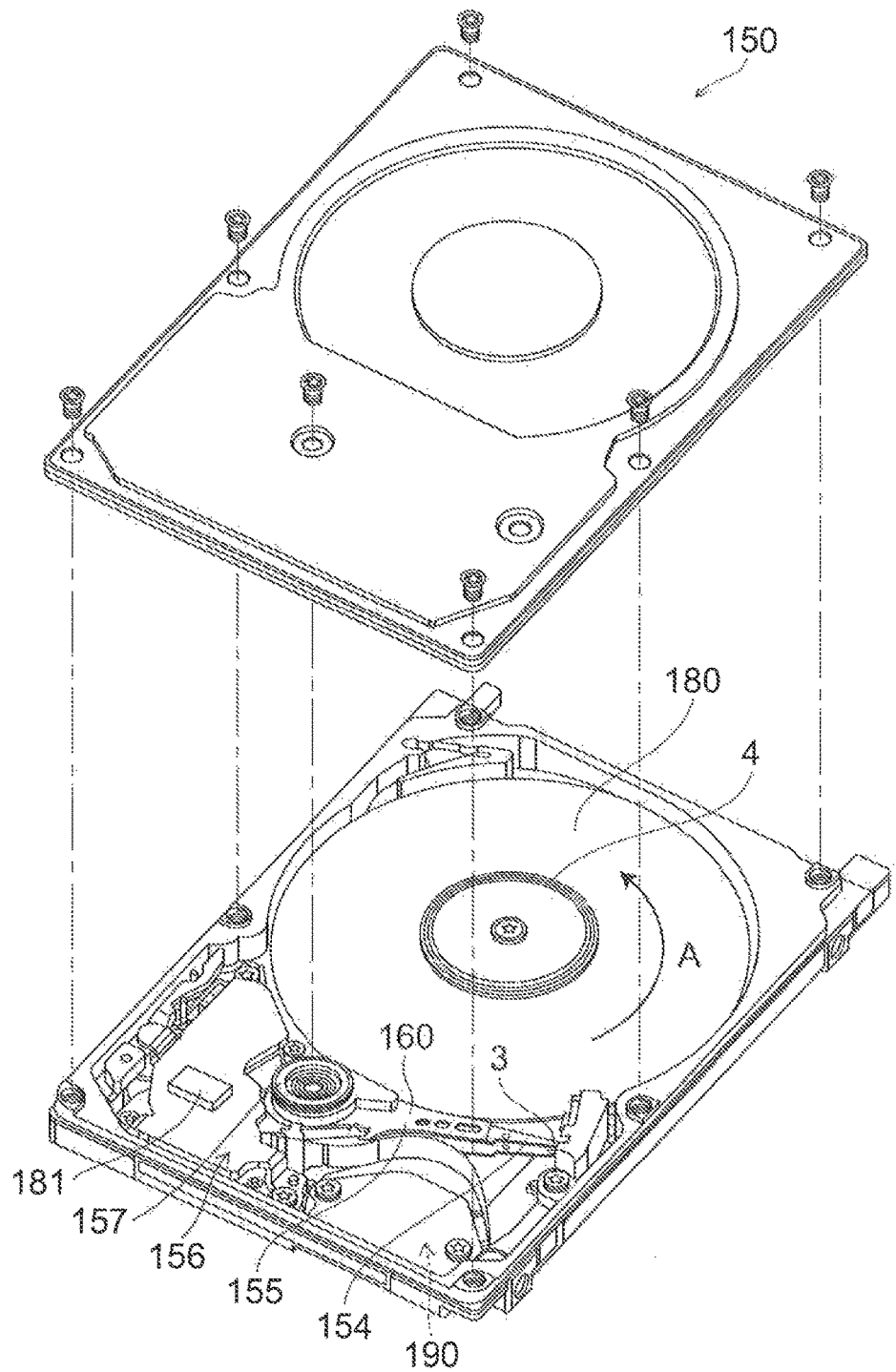
FIG. 18 is a schematic perspective view illustrating the magnetic recording and reproducing device according to the fifth embodiment.

FIG. 18 is a schematic perspective view illustrating the magnetic recording and reproducing device according to the fifth embodiment.

Figure 19A:
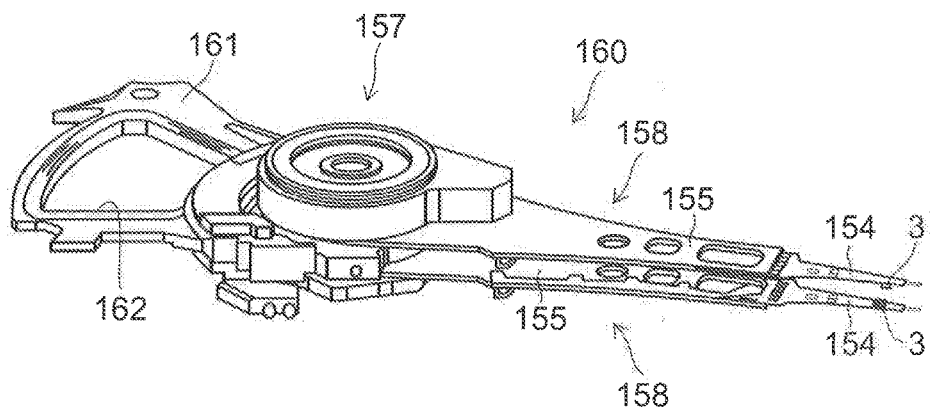
FIG. 19A and FIG. 19B are schematic perspective views illustrating a portion of the magnetic recording and reproducing device.
Figure 19B:
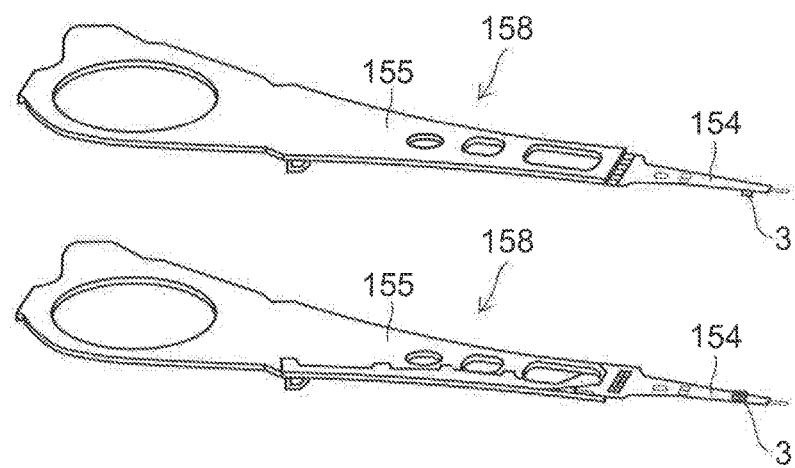

FIG. 19A and FIG. 19B are schematic perspective views illustrating a portion of the magnetic recording and reproducing device.

As illustrated in FIG. 18, the magnetic recording and reproducing device 150 according to the embodiment is a device that uses a rotary actuator. A recording medium disk 180 is mounted to a spindle motor 4 and is rotated in the direction of arrow A by a motor that responds to a control signal from a drive device controller. The magnetic recording and reproducing device 150 according to the embodiment may include multiple recording medium disks 180. The magnetic recording and reproducing device 150 may include a recording medium 181. For example, the magnetic recording and reproducing device 150 is a hybrid HDD (Hard Disk Drive). The recording medium 181 is, for example, a SSD (Solid State Drive). The recording medium 181 includes, for example, nonvolatile memory such as flash memory, etc.

The head slider 3 that performs the recording and reproducing of the information stored in the recording medium disk 180 has a configuration such as that described above and is mounted to the tip of a suspension 154 having a thin-film configuration. Here, for example, one of the magnetic heads according to the embodiments described above is mounted at the tip vicinity of the head slider 3.

When the recording medium disk 180 rotates, the medium-opposing surface (the ABS) of the head slider 3 is held at a prescribed fly height from the surface of the recording medium disk 180 by the balance between the downward pressure due to the suspension 154 and the pressure generated by the medium-opposing surface of the head slider 3. A so-called "contact-sliding" head slider 3 that contacts the recording medium disk 180 may be used.

The suspension 154 is connected to one end of an arm 155 (e.g., an actuator arm). The arm 155 includes, for example, a bobbin unit holding a drive coil, etc. A voice coil motor 156 which is one type of linear motor is provided at one other end of the arm 155. The voice coil motor 156 may include a drive coil that is wound onto the bobbin unit of the arm 155, and a magnetic circuit made of a permanent magnet and an opposing yoke that are disposed to oppose each other with the coil interposed. The suspension 154 has one end and one other end; the magnetic head is mounted to the one end of the suspension 154; and the arm 155 is connected to the one other end of the suspension 154.

The arm 155 is held by ball bearings provided at two locations above and below a bearing unit 157; and the arm 155 can be caused to rotate and slide unrestrictedly by the voice coil motor 156. As a result, the magnetic head is movable to any position of the recording medium disk 180.

FIG. 19A illustrates the configuration of a portion of the magnetic recording and reproducing device and is an enlarged perspective view of a head stack assembly 160.

FIG. 19B is a perspective view illustrating a magnetic head assembly (a head gimbal assembly (HGA)) 158 which is a portion of the head stack assembly 160.

As illustrated in FIG. 19A, the head stack assembly 160 includes the bearing unit 157, the head gimbal assembly 158, and a support frame 161. The head gimbal assembly 158 extends from the bearing unit 157. The support frame 161 extends from the bearing unit 157 in the reverse direction of the HGA. The support frame 161 supports a coil 162 of the voice coil motor.

As illustrated in FIG. 19B, the head gimbal assembly 158 includes the arm 155 that extends from the bearing unit 157, and the suspension 154 that extends from the arm 155.

The head slider 3 is mounted to the tip of the suspension 154. One of the magnetic heads according to the embodiments is mounted to the head slider 3.

In other words, the magnetic head assembly (the head gimbal assembly) 158 according to the embodiment includes the magnetic head according to the embodiment, the head slider 3 to which the magnetic head is mounted, the suspension 154 that has the head slider 3 mounted to one end of the suspension 154, and the arm 155 that is connected to the other end of the suspension 154.

The suspension 154 includes lead wires (not illustrated) that are for recording and reproducing signals, for a heater that adjusts the fly height, for example, for a spin torque oscillator, etc. The lead wires are electrically connected to electrodes of the magnetic head embedded in the head slider 3.

A controller 190 that performs recording and reproducing of the signals to and from the magnetic recording medium by using the magnetic head also is provided. For example, the controller 190 is provided at a portion of the magnetic recording and reproducing device 150 (referring to FIG. 18). The input/output lines of the controller 190 are electrically coupled to the magnetic head by being connected to electrode pads of the head gimbal assembly 158.

Thus, the magnetic recording and reproducing device 150 according to the embodiment includes a magnetic recording medium, a magnetic head, a movable unit that is relatively movable in a state in which the magnetic recording medium and the magnetic head are separated from each other or in contact with each other, a position controller that aligns the magnetic head at a prescribed recording position of the magnetic recording medium, and a controller that records and reproduces signals to and from the magnetic recording medium that uses the magnetic head.

In other words, the recording medium disk 180 is used as the magnetic recording medium recited above.

The movable unit recited above may include the head slider 3.

The position controller recited above may include the head gimbal assembly 158.

The magnetic recording and reproducing device that performs the recording and reproducing of the information by utilizing the magnetization states has the features of a large recording capacity, a high-speed reproducing/recording speed, nonvolatile recording, an inexpensive bit cost, etc. More performance improvement is desirable for the magnetic recording and reproducing device.

The recording density increase of magnetic recording to date has been realized by downscallng the recorded bits. However, such methods have reached limits. To downscale the recorded bits, a medium material that has a high magnetic anisotropy energy is used to satisfy the condition of thermal stability expressed by $(K_u \cdot V)/(k_B \cdot T)$ described above (e.g., >60). Such a medium material has high coercivity. Therefore, the intensity of the magnetic field generated from the magnetic head is insufficient; the magnetization reversal cannot be caused to occur; and the recording (the writing) of the information cannot be performed. For example, a trilemma problem occurs.

Conversely, microwave assisted magnetic recording (MAMR) has been proposed. In MAMR, a high frequency magnetic field (a microwave magnetic field) from the magnetic head is applied, with the recording magnetic field, to the magnetic recording medium. By exciting the magnetization oscillation of the recorded bit, the magnetization reversal is performed using the recording magnetic field that is not more than the coercivity. The reduction effect of such a magnetic switching field is called the assist effect. By MAMR, it is possible to record the information in a medium material having high magnetic anisotropy. Thereby, the stability of the recording improves; and a high recording density is obtained.

Other than MAMR, a three-dimensional magnetic recording method has been proposed to increase the recording density using a magnetic recording medium including multiple magnetic recording layers. A recording principle similar to MAMR is applicable as a writing method suited to three-dimensional magnetic recording. The magnetic recording layers of the magnetic recording medium are designed to have different ferromagnetic resonance (FMR) frequencies by a method such as adjusting the material composition. A high frequency magnetic field is applied to provide the assist effect for only the selected magnetic recording layer. Thereby, the writing of the selected magnetic recording layer can be performed without disturbing the magnetization directions of the other layers.

To increase the recording density of the writing, it is desirable for the ease of causing the magnetization reversal to change abruptly as the relative position from the magnetic head changes. Thereby, the writing can be performed by determining the transition position of the magnetization in a stable state. In MAMR, the magnetization reversal is affected by various factors such as the intensity of the high frequency magnetic field, the polarization direction, the write magnetic field intensity, etc. Therefore, to realize higher density of the recording by considering these factors, it is desirable to suppress the record errors, design a magnetic head in which stable magnetization reversal is realizable, and control the operations of the magnetic head.

The embodiments include the following configurations:
(Configuration 1)
A magnetic recording and reproducing device, comprising:
a magnetic recording medium;
a magnetic head; and
a controller,
the controller implementing a first operation in a first information recording interval, the first information recording interval including a first recording interval and a first non-recording interval,
the controller implementing a second operation in a second information recording interval, the second information recording interval including a second recording interval and a second non-recording interval and being continuous with the first information recording interval,
the first operation including:
in the first recording interval, generating a first signal magnetic field while generating a first recording magnetic field from the magnetic head, the first signal magnetic field being of a first intensity and a high frequency, the first recording magnetic field corresponding to the first information; and
in the first non-recording interval, generating a first non-signal magnetic field from the magnetic head, the first non-signal magnetic field being of an intensity lower than the first intensity, the second operation including:
in the second recording interval, generating a second signal magnetic field while generating a second recording magnetic field from the magnetic head, the second signal magnetic field being of a second intensity and a high frequency, the second recording magnetic field corresponding to the first information; and
in the second non-recording interval, generating a second non-signal magnetic field from the magnetic head, the second non-signal magnetic field being of an intensity lower than the second intensity.

(Configuration 2)

The device according to configuration 1, wherein
the first operation further includes generating the first recording magnetic field from the magnetic head in the first non-recording interval, and
the second operation further includes generating the second recording magnetic field from the magnetic head in the second non-recording interval.

(Configuration 3)

The device according to configuration 1 or 2, wherein
the controller further implements a third operation in a third information recording interval, the third information recording interval including a third recording interval and a third non-recording interval and being continuous with the second information recording interval, and
the third operation includes:
in the third recording interval, generating a third signal magnetic field while generating a third recording magnetic field from the magnetic head, the third signal magnetic field being of a third intensity and a high frequency, the third recording magnetic field corresponding to second information different from the first information; and
in the third non-recording interval, generating a third non-signal magnetic field from the magnetic head, the third non-signal magnetic field being of an intensity lower than the third intensity.

(Configuration 4)

The device according to configuration 3, wherein the third recording interval is after the third non-recording interval in the third information recording interval.

(Configuration 5)

The device according to configuration 3, wherein
the third information recording interval further includes a third other non-recording interval after the third recording interval, and
the third operation in the third other non-recording interval further includes generating a third other non-signal magnetic field from the magnetic head, the third other non-signal magnetic field being of an intensity lower than the third intensity.

(Configuration 6)

The device according to one of configurations 3 to 5, wherein a frequency of the third signal magnetic field is not less than 1 GHz and not more than 100 GHz.

(Configuration 7)

The device according to one of configurations 3 to 6, wherein the intensity of the third non-signal magnetic field is not more than ½ of the third intensity.

(Configuration 8)

The device according to configurations 1 to 7, wherein the first recording interval is after the first non-recording interval in the first information recording interval.

(Configuration 9)

The device according to configuration 8, wherein the first information recording interval further includes a first other non-recording interval after the first recording interval, and
the first operation further in the first other non-recording interval further includes generating a first other non-signal magnetic field from the magnetic head, the first other non-signal magnetic field being of an intensity lower than the first intensity.

(Configuration 10)

The device according to one of configurations 1 to 9, wherein a frequency of the first signal magnetic field is not less than 1 GHz and not more than 100 GHz.

(Configuration 11)

The device according to one of configurations 1 to 10, wherein the intensity of the first non-signal magnetic field is not more than ½ of the third intensity.

(Configuration 12)

The device according to one of configurations 1 to 11, wherein the second recording interval is after the second non-recording interval in the second information recording interval.

(Configuration 13)

The device according to configuration 12, wherein
the second information recording interval further includes a second other non-recording interval after the second recording interval, and
the second operation in the second other non-recording interval further includes generating a second other non-signal magnetic field from the magnetic head, the second other non-signal magnetic field being of an intensity lower than the second intensity.

(Configuration 14)

The device according to one of configurations 1 to 13, wherein
the magnetic head includes:
a magnetic pole;
a first coil generating the first recording magnetic field and the second recording magnetic field in the magnetic pole; and
a second coil generating the first signal magnetic field and the second signal magnetic field,
in the first recording interval, the controller supplies a first electrical signal of a high frequency to the second coil, the first electrical signal corresponding to the first signal magnetic field, and
in the second recording interval, the controller supplying a second electrical signal of a high frequency to the second coil, the second electrical signal corresponding to the second signal magnetic field.

(Configuration 15)

The device according to one of configurations 1 to 13, wherein
the magnetic head includes:
a magnetic pole generating the first recording magnetic field and the second recording magnetic field; and
a stacked body generating the first signal magnetic field and the second signal magnetic field, and
the stacked body includes:
a first electrode;
a second electrode;
a first magnetic layer provided between the first electrode and the second electrode;
a second magnetic layer provided between the first magnetic layer and the second electrode; and
an intermediate layer provided between the first magnetic layer and the second magnetic layer.

(Configuration 16)

The device according to configuration 15, wherein a high frequency magnetic field is emitted from the stacked body according to a current flowing between the first electrode and the second electrode.

(Configuration 17)

The device according to configuration 16, wherein the controller in the first recording interval supplies a current pulse between the first electrode and the second electrode.

(Configuration 18)

The device according to configuration 17, wherein the current pulse includes a former interval signal, and a latter interval signal after the former interval signal, and an intensity of the former interval signal is higher than an intensity of the latter interval signal.

(Configuration 19)

The device according to one of configurations 1 to 18, wherein the magnetic recording medium includes:

a first magnetic recording layer; and a second magnetic recording layer disposed between the first magnetic recording layer and the magnetic head.

(Configuration 20)

The device according to configuration 19, wherein the first magnetic recording layer has a first ferromagnetic resonance frequency, the second magnetic recording layer has a second ferromagnetic resonance frequency higher than the first ferromagnetic resonance frequency, and a frequency of the first signal magnetic field when recording the first information in the first magnetic recording layer is lower than the frequency of the first signal magnetic field when recording the first information in the second magnetic recording layer.

(Configuration 21)

The device according to configuration 19, wherein the first signal magnetic field has:

a first pulse width;

a first frequency causing a magnetic switching field intensity of the first magnetic recording layer to be lower than a magnetic switching field intensity of the second magnetic recording layer; and a second frequency being higher than the first frequency and causing the magnetic switching field intensity of the first magnetic recording layer to be higher than the magnetic switching field intensity of the second magnetic recording layer, the controller sets a frequency of the first signal magnetic field to be the first frequency when recording the first information in the first magnetic recording layer, and the controller sets the frequency of the first signal magnetic field to be the second frequency when recording the first information in the second magnetic recording layer.

According to the embodiment, a magnetic recording and reproducing device capable of improving the recording density can be provided.

Hereinabove, exemplary embodiments of the invention are described with reference to specific examples. However, the embodiments of the invention are not limited to these specific examples. For example, one skilled in the art may similarly practice the invention by appropriately selecting specific configurations of components such as magnetic heads, magnetic recording mediums, memory cells, device isolation insulating layers, alignment mark units, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic recording and reproducing devices practicable by an appropriate design modification by one skilled in the art based on the magnetic recording and reproducing devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic recording and reproducing device, comprising:

a magnetic recording medium;

a magnetic head; and a controller, the controller implementing a first operation in a first information recording interval, the first information recording interval including a first recording interval and a first non-recording interval, the controller implementing a second operation in a second information recording interval, the second information recording interval including a second recording interval and a second non-recording interval and being continuous with the first information recording interval, the first operation including:

in the first recording interval, generating a first signal magnetic field while generating a first recording magnetic field from the magnetic head, the first signal magnetic field being of a first intensity and a high frequency, the first recording magnetic field corresponding to the first information; and in the first non-recording interval, generating a first non-signal magnetic field from the magnetic head, the first non-signal magnetic field being of an intensity lower than the first intensity, the second operation including:

in the second recording interval, generating a second signal magnetic field while generating a second recording magnetic field from the magnetic head, the second signal magnetic field being of a second intensity and a high frequency, the second recording magnetic field corresponding to the first information; and in the second non-recording interval, generating a second non-signal magnetic field from the magnetic head, the second non-signal magnetic field being of an intensity lower than the second intensity.

2. The device according to claim 1, wherein
the first operation further includes generating the first recording magnetic field from the magnetic head in the first non-recording interval, and
the second operation further includes generating the second recording magnetic field from the magnetic head in the second non-recording interval.

3. The device according to claim 1, wherein
the controller further implements a third operation in a third information recording interval, the third information recording interval including a third recording interval and a third non-recording interval and being continuous with the second information recording interval, and
the third operation includes:
in the third recording interval, generating a third signal magnetic field while generating a third recording magnetic field from the magnetic head, the third signal magnetic field being of a third intensity and a high frequency, the third recording magnetic field corresponding to second information different from the first information; and
in the third non-recording interval, generating a third non-signal magnetic field from the magnetic head, the third non-signal magnetic field being of an intensity lower than the third intensity.

4. The device according to claim 3, wherein the third recording interval is after the third non-recording interval in the third information recording interval.

5. The device according to claim 3, wherein
the third information recording interval further includes a third other non-recording interval after the third recording interval, and
the third operation in the third other non-recording interval further includes generating a third other non-signal magnetic field from the magnetic head, the third other non-signal magnetic field being of an intensity lower than the third intensity.

6. The device according to claim 3, wherein a frequency of the third signal magnetic field is not less than 1 GHz and not more than 100 GHz.

7. The device according to claim 3, wherein the intensity of the third non-signal magnetic field is not more than ½ of the third intensity.

8. The device according to claim 1, wherein the first recording interval is after the first non-recording interval in the first information recording interval.

9. The device according to claim 8, wherein
the first information recording interval further includes a first other non-recording interval after the first recording interval, and
the first operation in the first other non-recording interval further includes generating a first other non-signal magnetic field from the magnetic head, the first other non-signal magnetic field being of an intensity lower than the first intensity.

10. The device according to claim 1, wherein a frequency of the first signal magnetic field is not less than 1 GHz and not more than 100 GHz.

11. The device according to claim 1, wherein the second recording interval is after the second non-recording interval in the second information recording interval.

12. The device according to claim 11, wherein
the second information recording interval further includes a second other non-recording interval after the second recording interval, and
the second operation in the second other non-recording interval further includes generating a second other non-signal magnetic field from the magnetic head, the second other non-signal magnetic field being of an intensity lower than the second intensity.

13. The device according to claim 1, wherein
the magnetic head includes:
a magnetic pole;
a first coil generating the first recording magnetic field and the second recording magnetic field in the magnetic pole; and
a second coil generating the first signal magnetic field and the second signal magnetic field,
in the first recording interval, the controller supplies a first electrical signal of a high frequency to the second coil, the first electrical signal corresponding to the first signal magnetic field, and
in the second recording interval, the controller supplying a second electrical signal of a high frequency to the second coil, the second electrical signal corresponding to the second signal magnetic field.

14. The device according to claim 1, wherein
the magnetic head includes:
a magnetic pole generating the first recording magnetic field and the second recording magnetic field; and
a stacked body generating the first signal magnetic field and the second signal magnetic field, and
the stacked body includes:
a first electrode;
a second electrode;
a first magnetic layer provided between the first electrode and the second electrode;
a second magnetic layer provided between the first magnetic layer and the second electrode; and
an intermediate layer provided between the first magnetic layer and the second magnetic layer.

15. The device according to claim 14, wherein a high frequency magnetic field is emitted from the stacked body according to a current flowing between the first electrode and the second electrode.

16. The device according to claim 15, wherein the controller in the first recording interval supplies a current pulse between the first electrode and the second electrode.

17. The device according to claim 16, wherein
the current pulse includes a former interval signal, and a latter interval signal after the former interval signal, and
an intensity of the former interval signal is higher than an intensity of the latter interval signal.

18. The device according to claim 1, wherein
the magnetic recording medium includes:
a first magnetic recording layer; and
a second magnetic recording layer disposed between the first magnetic recording layer and the magnetic head.

19. The device according to claim 18, wherein
the first magnetic recording layer has a first ferromagnetic resonance frequency,
the second magnetic recording layer has a second ferromagnetic resonance frequency higher than the first ferromagnetic resonance frequency, and
a frequency of the first signal magnetic field when recording the first information in the first magnetic recording layer is lower than the frequency of the first signal magnetic field when recording the first information in the second magnetic recording layer.

20. The device according to claim 18, wherein
the first signal magnetic field has:
  a first pulse width;
  a first frequency causing a magnetic switching field intensity of the first magnetic recording layer to be lower than a magnetic switching field intensity of the second magnetic recording layer; and
  a second frequency being higher than the first frequency and causing the magnetic switching field intensity of the first magnetic recording layer to be higher than the magnetic switching field intensity of the second magnetic recording layer,
the controller sets a frequency of the first signal magnetic field to be the first frequency when recording the first information in the first magnetic recording layer, and
the controller sets the frequency of the first signal magnetic field to be the second frequency when recording the first information in the second magnetic recording layer.

* * * * *